United States Patent
Chen et al.

(10) Patent No.: US 12,455,480 B2
(45) Date of Patent: Oct. 28, 2025

(54) DISPLAY SUBSTRATE AND DISPLAY APPARATUS

(71) Applicants: Chongqing BOE Optoelectronics Technology Co., Ltd., Chongqing (CN); BOE Technology Group Co., Ltd., Beijing (CN)

(72) Inventors: Junming Chen, Beijing (CN); Ying Chen, Beijing (CN); Xiaoyuan Wang, Beijing (CN); Xun Pu, Beijing (CN); Bin Wan, Beijing (CN); Guodong Yang, Beijing (CN); Jiandong Guo, Beijing (CN); Zhongshan Wu, Beijing (CN); Yan Liu, Beijing (CN); Yuanyuan Zhu, Beijing (CN); Dong Wang, Beijing (CN)

(73) Assignees: CHONGQING BOE OPTOELECTRONICS TECHNOLOGY CO., LTD., Chongqing (CN); Beijing BOE Technology Development Co., Ltd, Beijing (CN)

( * ) Notice: Subject to any disclaimer, the term of this patent is extended or adjusted under 35 U.S.C. 154(b) by 0 days.

(21) Appl. No.: 18/292,101

(22) PCT Filed: Sep. 30, 2022

(86) PCT No.: PCT/CN2022/123386
§ 371 (c)(1),
(2) Date: Jan. 25, 2024

(87) PCT Pub. No.: WO2024/065728
PCT Pub. Date: Apr. 4, 2024

(65) Prior Publication Data
US 2025/0093718 A1 Mar. 20, 2025

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC .......................... G02F 1/136286; G02F 1/1368
See application file for complete search history.

(56) References Cited

U.S. PATENT DOCUMENTS 5,737,041 A * 4/1998 Holmberg .......... H10D 30/6757
 438/149
2002/0075421 A1* 6/2002 Wu .................. G02F 1/136286
 349/43

(Continued)

FOREIGN PATENT DOCUMENTS

CN 203733797 U 7/2014
CN 104965368 A 10/2015

(Continued)

OTHER PUBLICATIONS

Wang et al.CN210573114U, machine translation, Sep. 2020 (Year: 2020).*

(Continued)

*Primary Examiner* — Tracie Y Green
(74) *Attorney, Agent, or Firm* — Nath, Goldberg & Meyer; Joshua B. Goldberg

(57) ABSTRACT

A display substrate, including a plurality of gate lines and a plurality of data lines defining a plurality of pixel regions, where the plurality of pixel regions include a plurality of normal pixel regions and a plurality of redundant pixel regions at a periphery of the normal pixel regions; where each normal pixel region is provided with a first pixel electrode and a first transistor, each redundant pixel region is provided with a second pixel electrode and a second transistor, a gate of the first transistor is connected to a corresponding gate line, a source of the first transistor is connected to a corresponding data line, and a drain of the (Continued)

first transistor is connected to the first pixel electrode; and the second pixel electrode and the second transistor are insulated and spaced apart from each other.

17 Claims, 28 Drawing Sheets

(56) References Cited

U.S. PATENT DOCUMENTS

| | | | |
|---|---|---|---|
| 2021/0333667 A1 | 10/2021 | Tian et al. | |
| 2024/0179944 A1* | 5/2024 | Wang | H10K 59/1213 |
| 2024/0266358 A1* | 8/2024 | Xu | H10D 86/60 |

FOREIGN PATENT DOCUMENTS

| CN | 103149757 B | 11/2015 |
|---|---|---|
| CN | 105161495 A | 12/2015 |
| CN | 105161505 A | 12/2015 |
| CN | 205608341 U | 9/2016 |
| CN | 106200155 A | 12/2016 |
| CN | 206282048 U | 6/2017 |
| CN | 107464806 A | 12/2017 |
| CN | 106449705 B | 4/2019 |
| CN | 210573114 U | 5/2020 |
| CN | 111474781 A | 7/2020 |
| CN | 112582342 A | 3/2021 |
| CN | 113078167 A | 7/2021 |
| CN | 108803173 B | 8/2021 |
| CN | 114721195 A | 7/2022 |

OTHER PUBLICATIONS

Cui, CN112582342A, machine translation Mar. 2021 (Year: 2021).*
Xi, CN111474781A, machine translation, Jul. 2020 (Year: 2020).*

* cited by examiner

DISPLAY SUBSTRATE AND DISPLAY APPARATUS

This is a National Phase Application filed under 35 U.S.C. 371 as a national stage of PCT/CN2022/123386, filed Sep. 30, 2022, the contents of which are hereby incorporated by reference in its entirety.

TECHNICAL FIELD

The present disclosure relates to the field of display technology, and specifically relates to a display substrate and a display apparatus.

BACKGROUND

Currently, electronic display products have become important tools for people to acquire information in various aspects including daily office work, study and the like, and high-quality electronic products will become more competitive in the market with the update and upgrade of display products. The display panel is an important part affecting display quality of display product, and current common display panels include liquid crystal display (LCD) panels and organic light-emitting diode (OLED) panels.

SUMMARY

Embodiments of the present disclosure provide a display substrate and a display apparatus.

The present disclosure provides a display substrate, including:
 a substrate including a first region and a second region at a periphery of the first region; and
 a plurality of gate lines and a plurality of data lines on the substrate, wherein the plurality of gate lines and the plurality of data lines are intersected with each other to define a plurality of pixel regions in the first region; wherein the plurality of pixel regions include a plurality of normal pixel regions and a plurality of redundant pixel regions at a periphery of the normal pixel regions;
 wherein each normal pixel region is provided with a first pixel electrode and a first transistor, each redundant pixel region is provided with a second pixel electrode and a second transistor, a gate of the first transistor is connected to a corresponding gate line, a source of the first transistor is connected to a corresponding data line, and a drain of the first transistor is connected to the first pixel electrode; and
 the second pixel electrode and the second transistor are insulated and spaced apart from each other.

In some embodiments, the display substrate further includes:
 a first insulation layer on a side of the first transistor away from the substrate; and
 a second insulation layer on a side of the first insulation layer away from the substrate;
 wherein the first pixel electrode is connected to the drain of the first transistor through a first via running through the first insulation layer and the second insulation layer.

In some embodiments, the display substrate further includes:
 a common electrode between the first insulation layer and the second insulation layer, wherein a first hollowed-out portion is provided in the common electrode at a position corresponding to the drain of the first transistor; and an orthographic projection of the first via on the substrate is within an orthographic projection of the first hollowed-out portion on the substrate.

In some embodiments, the plurality of redundant pixel regions include a first redundant pixel region in which a connection part is disposed, and the connection part is in the same layer as, and insulated and spaced apart from, a source and a drain of the second transistor; and
 in the first redundant pixel region, the second pixel electrode is on a side of the second insulation layer away from the substrate, and electrically connected to the connection part through a second via running through the first insulation layer and the second insulation layer.

In some embodiments, the first pixel electrode and the second pixel electrode are in the same layer.

In some embodiments, the display substrate further includes:
 a common electrode between the first insulation layer and the second insulation layer, wherein a second hollowed-out portion is provided in the common electrode at a position corresponding to the connection part; and an orthographic projection of the second via on the substrate is within an orthographic projection of the second hollowed-out portion on the substrate.

In some embodiments, the plurality of redundant pixel regions include at least one second redundant pixel region in which the second pixel electrode is electrically connected to a common electrode.

In some embodiments, the common electrode is between the first insulation layer and the second insulation layer, wherein in the second redundant pixel region, the second pixel electrode is on a side of the second insulation layer away from the substrate, and connected to the common electrode through a third via in the second insulation layer.

In some embodiments, the source and the drain of the first transistor are on a side of the gate of the first transistor away from the substrate, with a gate insulation layer between the source and the drain, and the gate of the first transistor; and
 the display substrate further includes:
 a common electrode between the first insulation layer and the second insulation layer, and provided with a third hollowed-out portion;
 a first common electrode line in the same layer as the gate of the first transistor;
 a first transfer electrode in the same layer as the first pixel electrode; and
 a second transfer electrode in the same layer as the source and the drain of the first transistor; wherein
 the first transfer electrode is connected to the common electrode through a fourth via running through the second insulation layer, and connected to the second transfer electrode through a fifth via running through the first insulation layer and the second insulation layer, and the second transfer electrode is connected to the first common electrode line through a sixth via running through the gate insulation layer;
 wherein an orthographic projection of the fifth via on the substrate is within an orthographic projection of the third hollowed-out portion on the substrate.

In some embodiments, the fourth via is in communication with the fifth via.

In some embodiments, each pixel region is provided with the first transfer electrode and the second transfer electrode.

In some embodiments, a first hollowed-out portion is provided in the common electrode at a position corresponding to the drain of the first transistor; and the third hollowed-out portion and the first hollowed-out portion in each of at least one of the normal pixel regions are in communication with each other.

In some embodiments, the plurality of redundant pixel regions include a first redundant pixel region in which a connection part is disposed, and a second hollowed-out portion is provided in the common electrode at a position corresponding to the connection part; and the third hollowed-out portion and the second hollowed-out portion in each of at least one first redundant pixel region are in communication with each other.

In some embodiments, the gate lines each extend in a first direction, the data lines each extend in a second direction, and the first direction is intersected with the second direction; and the second region includes a bonding region on a side of the first region in the second direction, and the redundant pixel regions are provided on a side of the first region away from the bonding region, and two opposite sides of the first region in the first direction.

In some embodiments, the display substrate further includes:
a second common electrode line in the second region and in the same layer as the gate of the first transistor;
a common electrode between the first insulation layer and the second insulation layer, and provided with a fourth hollowed-out portion;
a third transfer electrode in the same layer as the first pixel electrode; and
a fourth transfer electrode in the same layer as the source and the drain of the first transistor; wherein
the third transfer electrode is connected to the common electrode through a seventh via running through the second insulation layer, and connected to the fourth transfer electrode through an eighth via running through the first insulation layer and the second insulation layer, and the fourth transfer electrode is connected to the second common electrode line through a ninth via running through a gate insulation layer;
wherein an orthographic projection of the eighth via on the substrate is within an orthographic projection of the fourth hollowed-out portion on the substrate.

In some embodiments, a distance from each one of the seventh via, the eighth via, and the ninth via to a region where the plurality of normal pixel regions are located is greater than 100 μm.

In some embodiments, the first pixel electrode includes an electrode body part and an electrode connection part connected with each other, the electrode body part is provided with a plurality of slits, and the electrode connection part is connected to the drain of the first transistor.

In some embodiments, a source and a drain of the second transistor each have an orthographic projection on the substrate overlapped with an orthographic projection of a gate of the second transistor on the substrate.

Embodiments of the present disclosure further provide a display apparatus, including the display substrate as described above.

BRIEF DESCRIPTION OF DRAWINGS

Accompanying drawings are provided for further understanding of the present disclosure and constitute a part of the specification. Hereinafter, these drawings are intended to explain the present disclosure together with the following specific implementations, but should not be considered as a limitation of the present disclosure, in which.

DETAIL DESCRIPTION OF EMBODIMENTS

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described embodiments are some, but not all, of the embodiments of the present disclosure. All other embodiments obtained by those of ordinary skill in the art based on the embodiments of the present disclosure described herein without paying any creative effort shall be included in the protection scope of the present disclosure.

Unless otherwise defined, technical or scientific terms used in the present disclosure are intended to have general meanings as understood by those of ordinary skill in the art. The words "first", "second" and the like used in the present disclosure do not denote any order, quantity, or importance, but are used merely for distinguishing different components from each other. Also, the words "a", "an", or "the" and the like do not denote a limitation of quantity, but rather denote the presence of at least one. The word "comprise" or "include" or the like means that the element or item preceding the word contains elements or items that appear after the word or equivalents thereof, but does not exclude other elements or items. The words "connected" or "coupled" and the like are not restricted to physical or mechanical connections, but may include electrical connections, whether direct or indirect. The words "upper", "lower", "left", "right", and the like are merely used to indicate a relative positional relationship, and when an absolute position of the described object is changed, the relative positional relationship may be changed accordingly.

Figure 1:
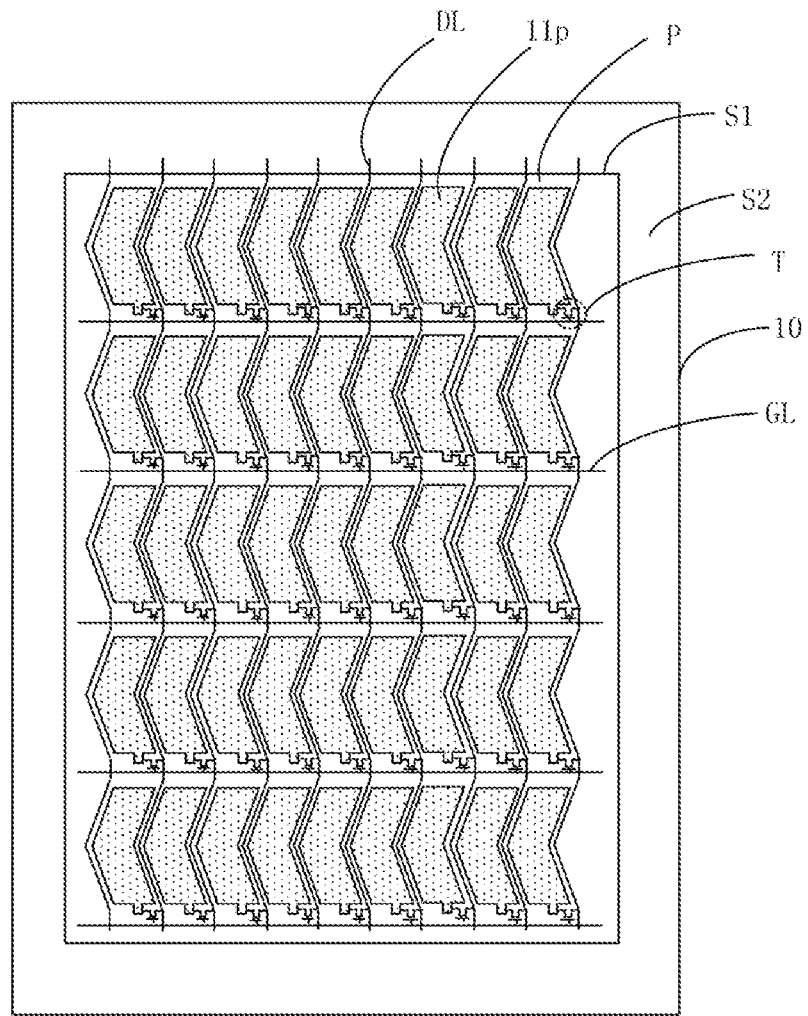
FIG. 1 is a schematic diagram of a display substrate according to an example.

FIG. 1 is a schematic diagram of a display substrate according to an example. As shown in FIG. 1, the display substrate includes a substrate 10, and a plurality of gate lines GL and a plurality of data lines DL on the substrate 10. The substrate 10 includes a first region S1 and a second region S2 at a periphery of the first region S1. The plurality of gate lines GL and the plurality of data lines DL are intersected with each other to define a plurality of pixel regions in the first region S1. Each pixel region is provided with a pixel electrode 11p and a thin film transistor T. A gate of the thin film transistor T is connected to a corresponding gate line GL, a source of the thin film transistor T is connected to a corresponding data line DL, and a drain of the thin film transistor T is connected to the pixel electrode 11p. When a scanning signal is applied to the gate line GL, the thin film transistor connected to the gate line GL is turned on, that is, it turns conductive between the source and the drain of the thin film transistor T.

Figure 2:
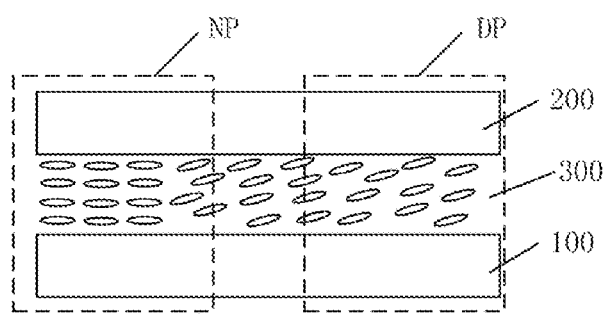
FIG. 2 is a schematic diagram of a display panel according to an example.

In one example, the display substrate may be applied to a liquid crystal display panel, and in this case, FIG. 2 is a schematic diagram of a display panel according to an example. As shown in FIG. 2, a display substrate 100 and an opposite substrate 200 are disposed opposite to each other, with a liquid crystal layer 300 interposed therebetween. Alignment layers (not shown) are provided on both a side of the display substrate 100 facing the liquid crystal layer 300, and a side of the opposite substrate 200 facing the liquid crystal layer 300, to align the liquid crystal layer 300. When the display panel is used for display, scanning signals are supplied to the gate lines GL one by one, so that thin film transistors are turned on row by row. Further, each time a scanning signal is supplied to a gate line GL, a data signal is passed to each of the plurality of data lines DL, causing the thin film transistor to transmit the data signal to the pixel electrode 11p. The display substrate or the opposite substrate is further provided with a common electrode 15 configured to load a common voltage signal so that an electric field is formed between the common electrode 15 and the pixel electrode 11p to drive the liquid crystal to deflect, thereby adjusting an emission amount of the pixel region and implementing display.

In the production and use of the display substrate, static electricity is likely to be generated at an edge position of the first region S1, causing a short circuit between the gate line GL and the data line DL and thus affecting normal display of the pixel region.

To alleviate the problem of abnormal display of the pixel region due to static electricity, in another example, pixel regions in the first region S1 close to the left and right sides of the first region S1 are used as redundant pixel regions DP, and when the display panel is driven to display and gate lines GL corresponding to the redundant pixel regions DP receive scanning signals, data signals are no longer provided for data lines DL corresponding to the redundant pixel regions DP, so that the redundant pixel regions DP are no longer used for display. In this manner, even if static electricity is generated at the edge position of the first region S1, only the redundant pixel regions DP will be affected.

However, the inventor has found that a voltage on the gate line GL is constantly switched between a high level (e.g., 18V) and a low level (e.g., −8V) during display of the display panel, and within a display period of one frame, the voltage on the gate line GL remains at the low level for a long time. When a short circuit occurs between the gate line GL and the data line DL corresponding to a redundant pixel region DP, a low level voltage is written to the pixel electrode in the redundant pixel region DP for a long time, so that the redundant pixel region DP is in a high voltage difference bias state for a long time, and a normal pixel region NP close to the redundant pixel region DP is also affected by an electric field of the redundant pixel region DP. When the display substrate has been operated for a long time, as shown in FIG. 2, the liquid crystal at edges of the redundant pixel region DP and the adjacent normal pixel region NP are polarized, causing the edge of the normal pixel region NP to illuminate. For example, assuming that the leftmost column of normal pixel regions NP in FIG. 1 are red pixel regions and the rightmost column of normal pixel regions NP are blue pixel regions, abnormal display such as red and blue lines occurs on the left and right sides of the display screen.

Figure 3:
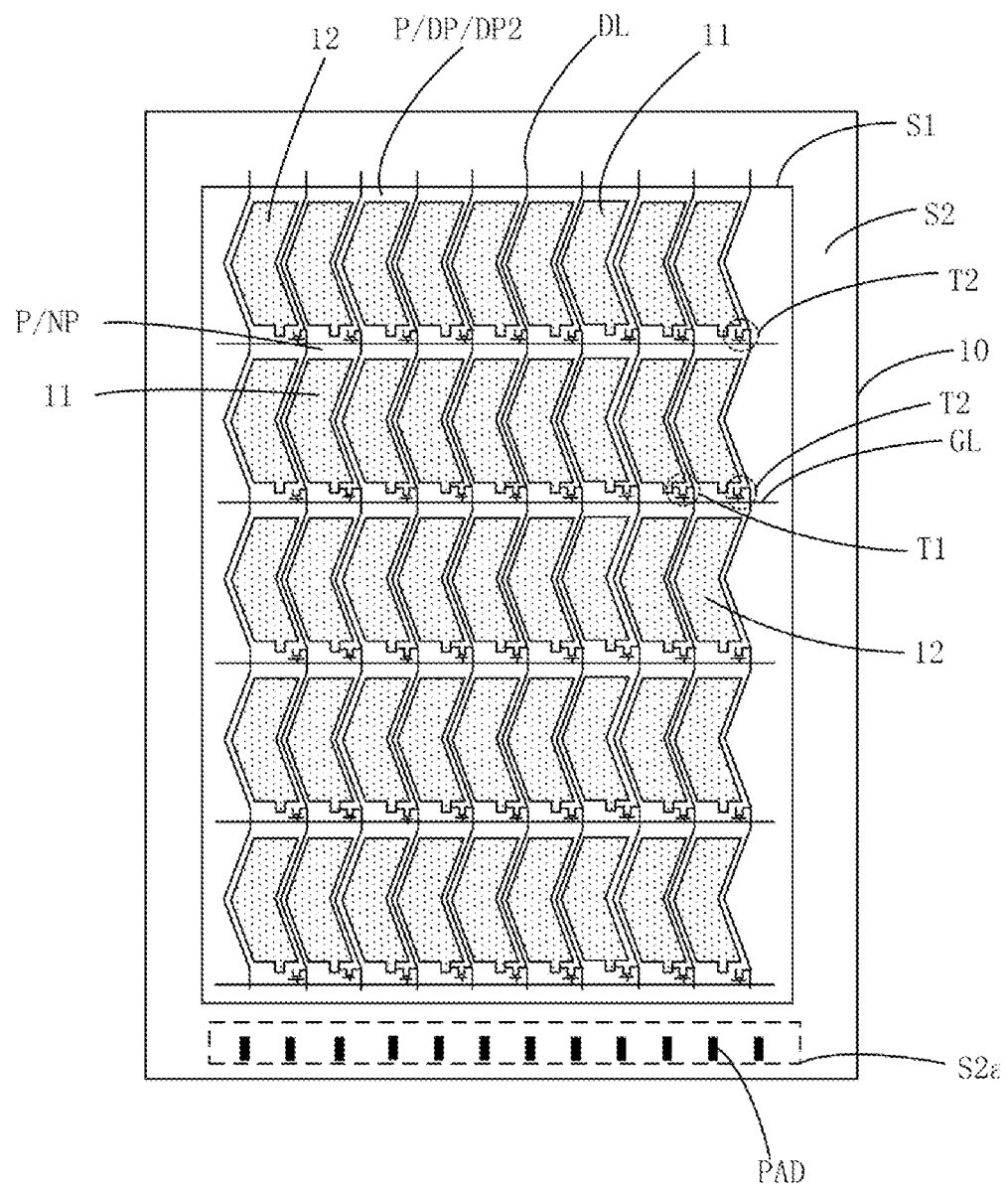
FIG. 3 is a schematic diagram of a display substrate according to some embodiments of the present disclosure.

FIG. 3 is a schematic diagram of a display substrate according to some embodiments of the present disclosure. As shown in FIG. 3, the display substrate includes a substrate 10, and a plurality of gate lines GL and a plurality of data lines DL on the substrate 10. The substrate 10 includes a first region S1 and a second region S2 at a periphery of the first region S1. The plurality of gate lines GL and the plurality of data lines DL are intersected with each other to define a plurality of pixel regions in the first region S1. The plurality of pixel regions include a plurality of normal pixel regions NP and a plurality of redundant pixel regions DP at a periphery of the normal pixel regions NP. In one example, the plurality of normal pixel regions NP in the first region S1 are arranged in multiple rows and columns, and a plurality of normal pixel regions NP in each row constitute a plurality of repeated units, each of which includes at least three different colors of pixel regions, for example, a red pixel region, a green pixel region, and a blue pixel region.

Each normal pixel region NP is provided with a first pixel electrode 11 and a first transistor T1. A gate of the first transistor T1 is connected to a corresponding gate line GL, a source of the first transistor T1 is connected to a corresponding data line DL, and a drain of the first transistor T1 is connected to the first pixel electrode 11. When a scanning signal is loaded to the gate line GL, it turns conductive between the source and the drain of the first transistor T1 to transmit a data signal from the data line DL to the first pixel electrode 11. Each redundant pixel region DP is provided with a second pixel electrode 12 and a second transistor T2 insulated and spaced apart from each other. It should be noted that the second pixel electrode 12 and the second transistor T2 insulated and spaced apart from each other means that there is no electrical connection between the second transistor T2 and the second pixel electrode 12. In other words, there is no electrical connection between any electrode (gate, active layer, source or drain) of the second transistor T2 and the second pixel electrode 12. For example, the second transistor T2 is spaced apart from the second pixel electrode 12 by an insulation layer.

In an embodiment of the present disclosure, the second transistor T2 and the second pixel electrode 12 in the redundant pixel region DP are insulated and spaced apart from each other. As a result, even if a short circuit occurs between the gate line GL and the data line DL corresponding to the redundant pixel region DP due to static electricity, the short-circuited gate line GL and data line DL will not be conducted with the second pixel electrode 12, and cause a high-level or low-level signal loaded to the second pixel electrode 12 for a long time, thereby preventing the liquid crystal in the normal pixel region NP from being affected by the electric field of the redundant pixel region DP and ensuring the display effect.

Figure 4:
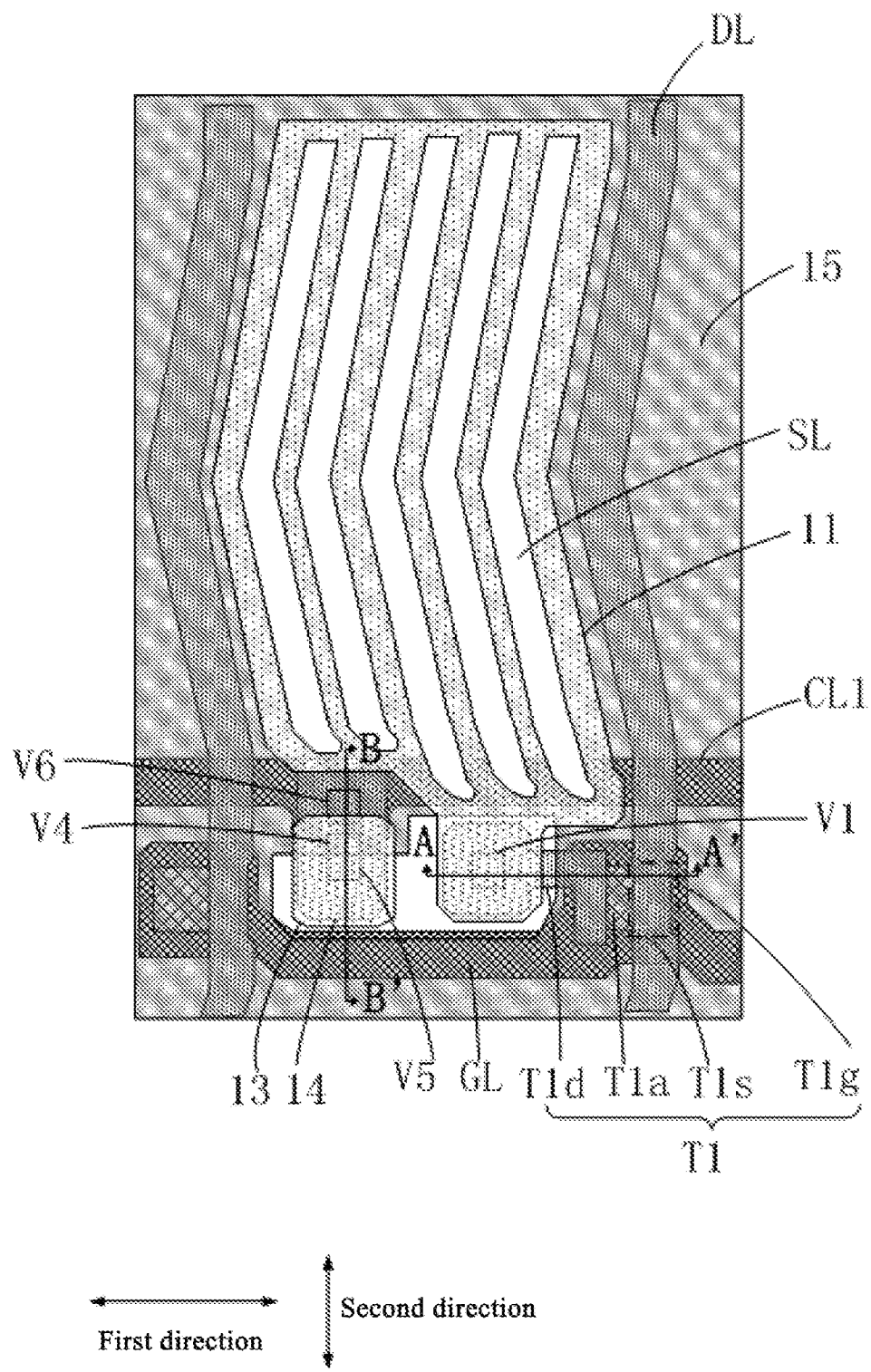
FIG. 4 is a structural plan view of a normal pixel region according to some embodiments of the present disclosure.
Figure 5:
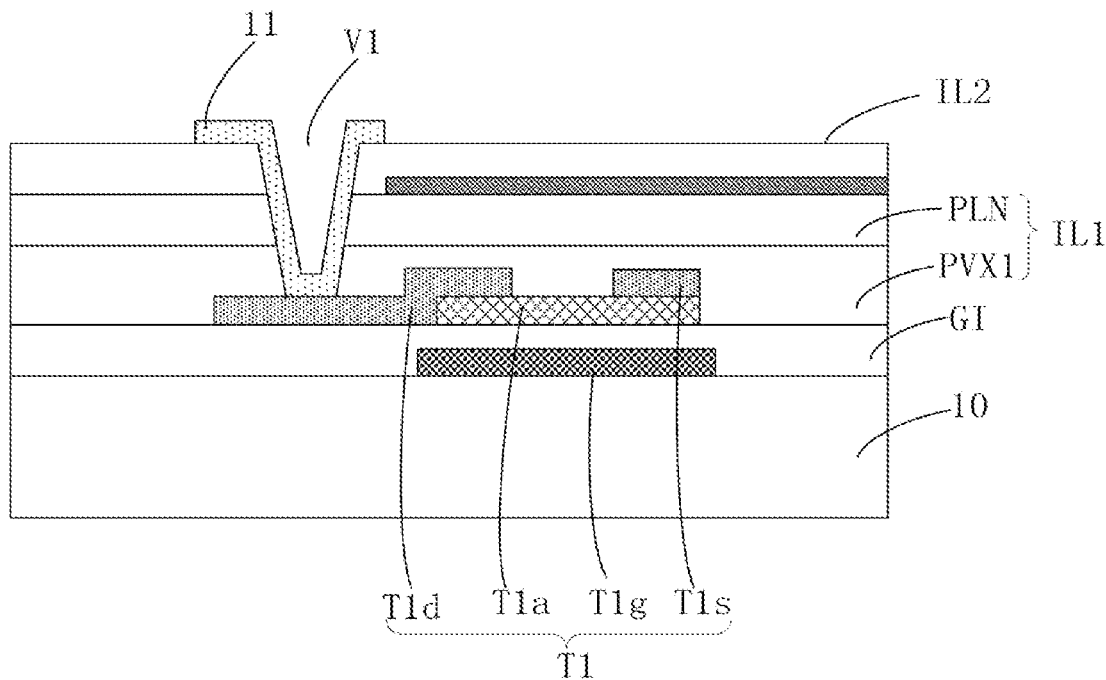
FIG. 5 is a sectional view taken along line A-A' in FIG. 4.
Figure 6:
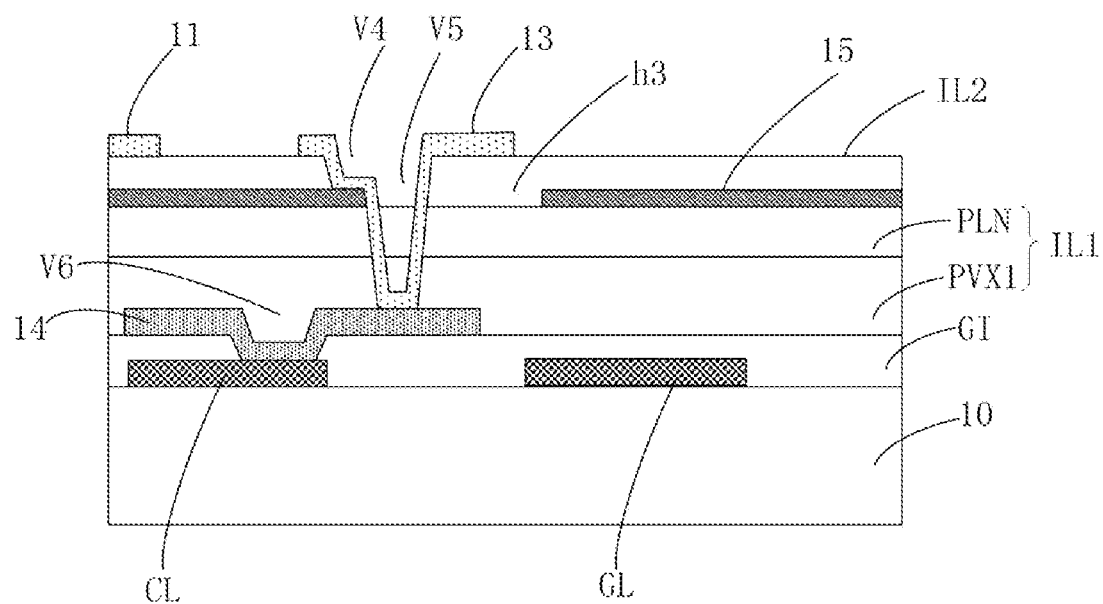
FIG. 6 is a sectional view taken along line B-B' in FIG. 4.
Figure 7:
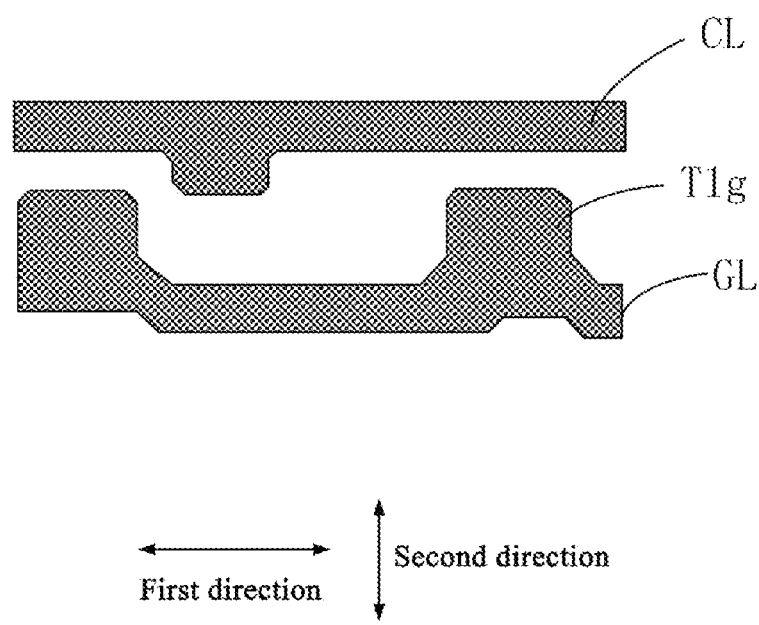
FIG. 7 is a plan view of a gate metal layer in FIG. 4.
Figure 8:
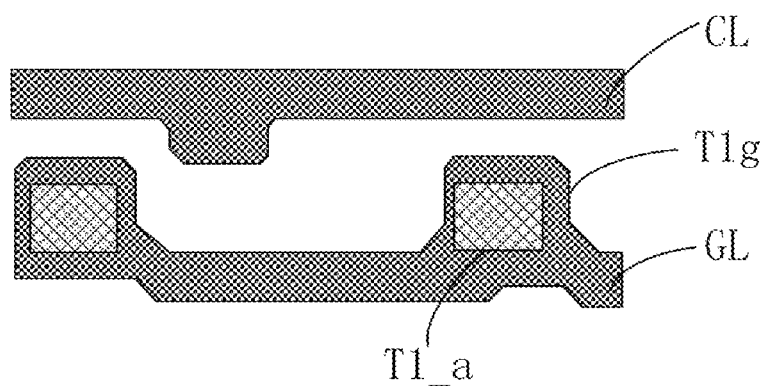
FIG. 8 is a plan view of a superposition of a gate metal layer and a semiconductor layer in FIG. 4.
Figure 9:
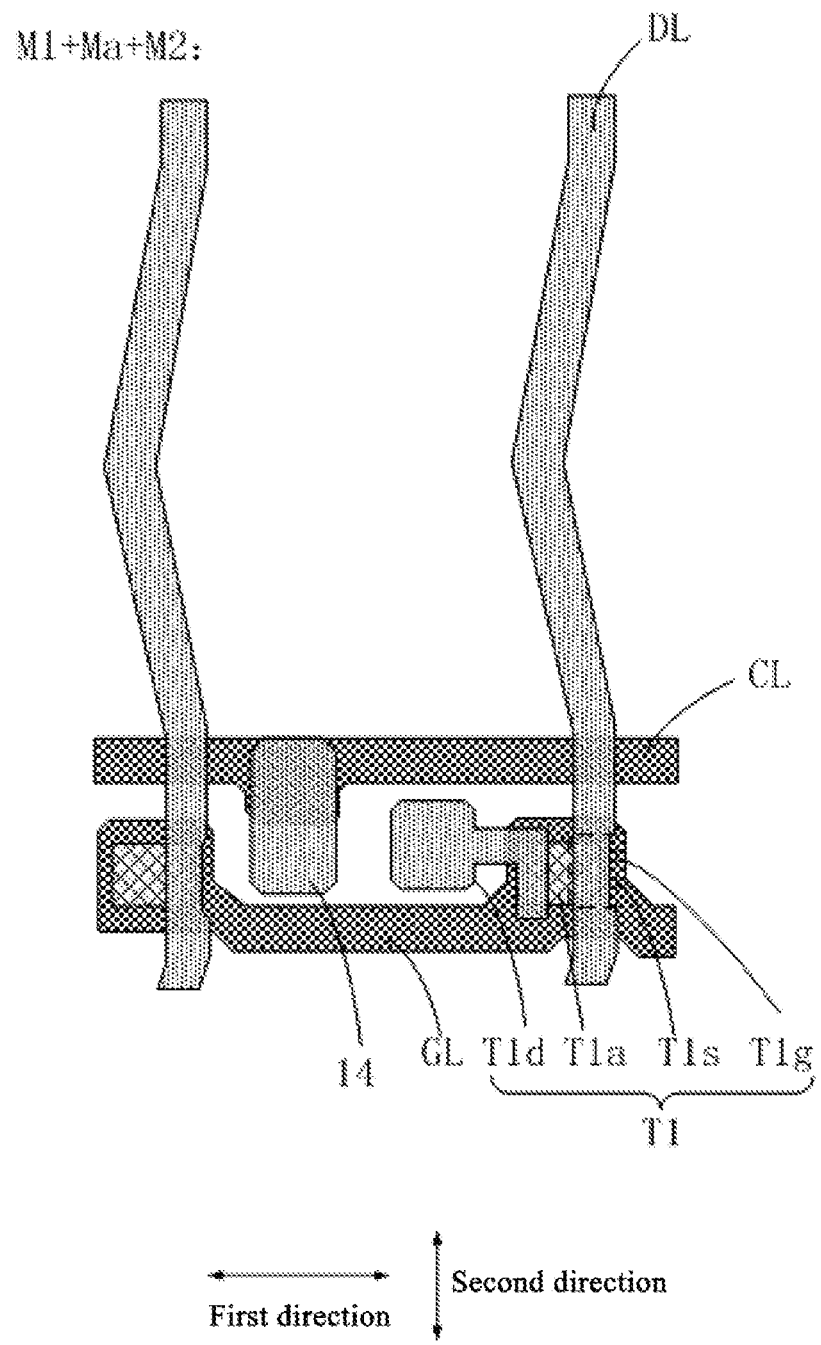
FIG. 9 is a plan view of a superposition of a gate metal layer, a semiconductor layer, and a source-drain metal layer in FIG. 4.
Figure 10:
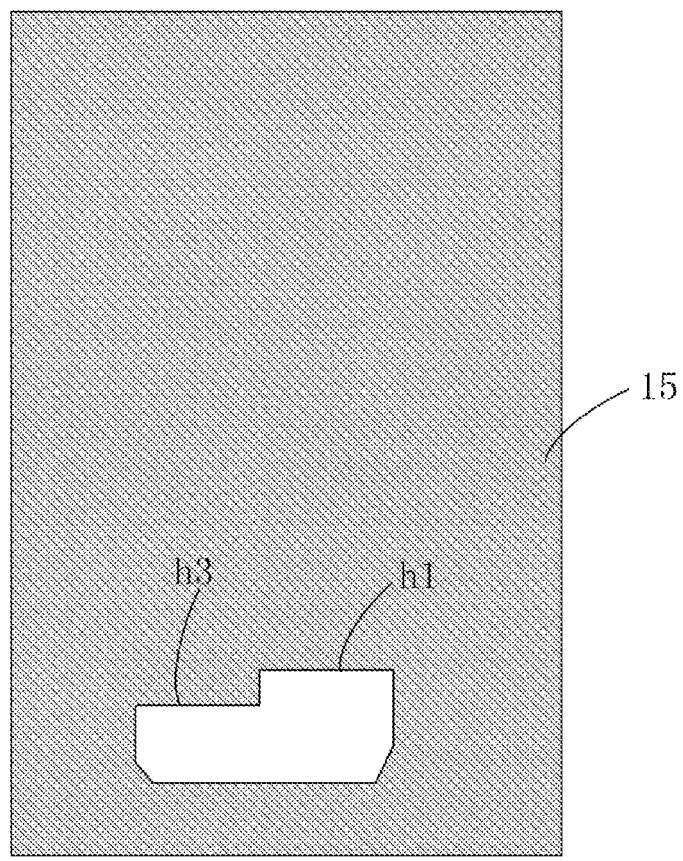
FIG. 10 is a schematic diagram of a first transparent conductive layer in FIG. 4.
Figure 11:
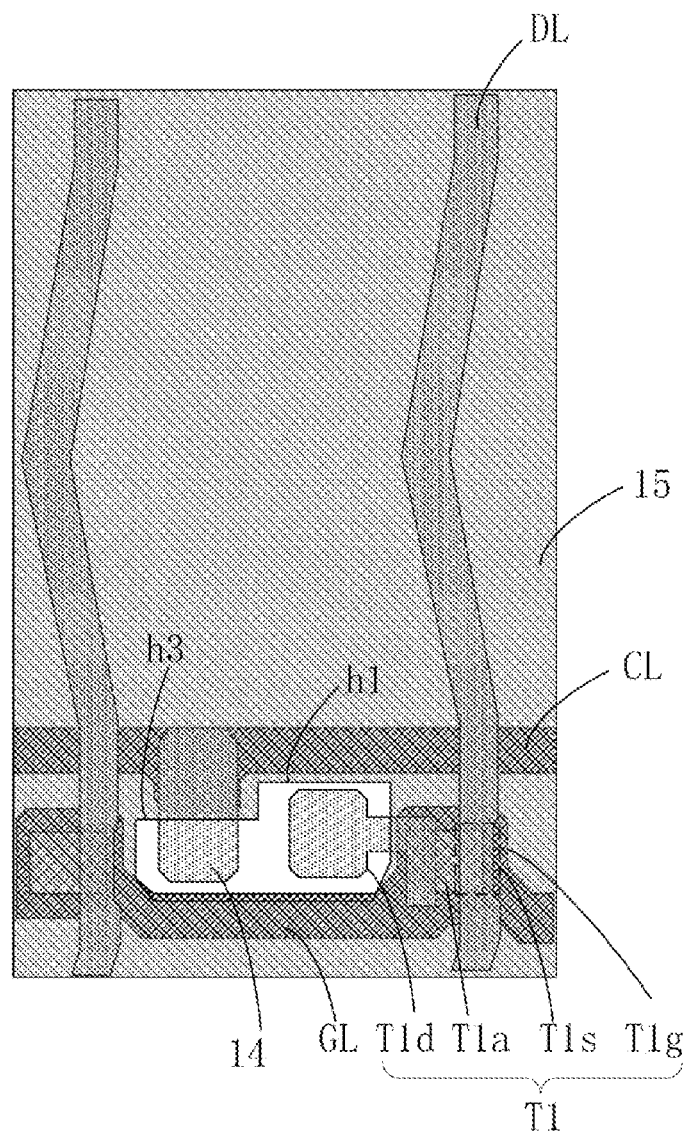
FIG. 11 is a plan view of a superposition of the structures in FIGS. 9 and 10.
Figure 12:
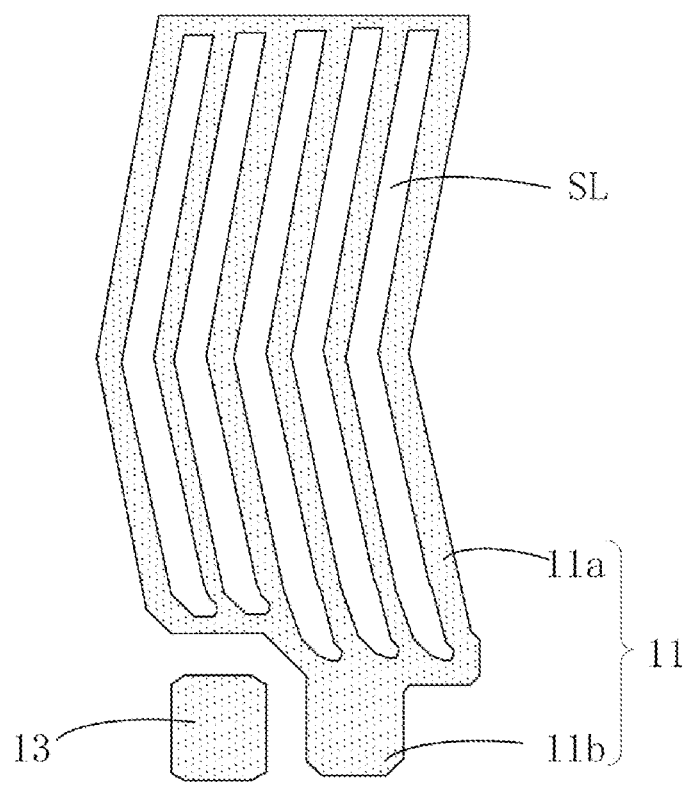
FIG. 12 is a schematic diagram of a second transparent conductive layer in FIG. 4.

FIG. 4 is a structural plan view of a normal pixel region according to some embodiments of the present disclosure, FIG. 5 is a sectional view taken along line A-A' in FIG. 4, FIG. 6 is a sectional view taken along line B-B' in FIG. 4, FIG. 7 is a plan view of a gate metal layer in FIG. 4, FIG. 8 is a plan view of a superposition of a gate metal layer and a semiconductor layer in FIG. 4, FIG. 9 is a plan view of a superposition of a gate metal layer, a semiconductor layer, and a source-drain metal layer in FIG. 4, FIG. 10 is a schematic diagram of a first transparent conductive layer in FIG. 4, FIG. 11 is a plan view of a superposition of the structures in FIGS. 9 and 10, and FIG. 12 is a schematic diagram of a second transparent conductive layer in FIG. 4.

As shown in FIGS. 4 to 11, the gate line GL and the gate of the first transistor T1 are disposed in the same layer, i.e., a gate metal layer. The gate line GL extends in a first direction. It should be noted that, in the embodiments of the present disclosure, extending in a certain direction refers to an overall tendency of a signal line extending in that certain direction, but not that the signal line is necessarily a straight line.

The gate of the first transistor T1 and the gate line GL may be formed as an integral structure. The gate metal layer M1 may be made of a material including, for example, a metal, a metal alloy, a metal nitride, a conductive metal oxide, a transparent conductive material, and the like. For example, the gate metal layer M1 may include gold, an alloy of gold, silver, an alloy of silver, aluminum, an alloy of aluminum, aluminum nitride, tungsten, tungsten nitride, copper, an alloy of copper, nickel, chromium, chromium nitride, molybdenum, an alloy of molybdenum, titanium, titanium nitride, platinum, tantalum, tantalum nitride, neodymium, scandium, strontium ruthenium oxide, zinc oxide, tin oxide, indium oxide, gallium oxide, indium tin oxide, indium zinc oxide, or the like. The gate metal layer M1 may have a single layer or multiple layers.

In some embodiments, the display substrate may further include a first common electrode line CL1 configured to provide a common voltage signal for the common electrode 15. The first common electrode line CL1 may be located in the gate metal layer M1 and extend in the first direction.

As shown in FIGS. 5 to 6, a gate insulation layer GI is located on a side of the gate metal layer M1 away from the substrate 10, and the gate insulation layer GI may be made of a material including, for example, a silicon compound or a metal oxide. For example, the gate insulation layer GI may be made of a material including silicon oxynitride, silicon oxide, silicon nitride, silicon oxycarbide, silicon carbonitride, aluminum oxide, aluminum nitride, tantalum oxide, hafnium oxide, zirconium oxide, titanium oxide, or the like. The gate insulation layer GI may be formed into a single-layer or multi-layer structure.

A semiconductor layer Ma is located on a side of the gate insulation layer GI away from the substrate 10, and includes an active layer T1a of each first transistor T1. The active layer T1a includes a channel part, and a source connection part and a drain connection part on both sides of the channel part. A source T1s is lapped on the source connection part, and a drain T1d is lapped on the drain connection part. Each of the source connection part and the drain connection part may be doped with an impurity (e.g., an N-type impurity or a P-type impurity) of a higher concentration than the channel part. The channel part is directly opposed to the gate T1g of the thin film transistor T1, and when a voltage signal applied to the gate T1g reaches a predetermined value, a carrier path is formed in the channel part, to turn it conductive between the source connection part and the drain connection part.

As shown in FIGS. 5 to 11, the source T1s and the drain T1d of the first transistor T1 are disposed on a side of the active layer away from the substrate 10, the source Tis contacts the source connection part, and the drain T1d contacts the drain connection part. The source T1s and the drain T1d of the first transistor T1 are both disposed in the same layer as the data line DL, i.e., in a source-drain metal layer M2. The data line DL extends in a second direction, which is intersected with, for example, perpendicular to, the first direction. The source T1s of the first transistor T1 and the data line DL may be formed as an integral structure. It should be noted that the data line DL extending in the second direction means that the data line DL has a general extending tendency along the second direction, but not that the data line DL is necessarily a straight line. As shown in FIG. 4, the data line DL may be bent, but extend in the second direction as a whole. The source-drain metal layer M2 is further provided with a second transfer electrode 14, and an orthographic projection of the second transfer electrode 14 on the substrate 10 is overlapped with an orthographic projection of the first common electrode line CL1 on the substrate 10. The source-drain metal layer M2 may be made of a material including, a metal, an alloy, a metal nitride, a conductive metal oxide, a transparent conductive material, and the like, and each of the source electrode T1s and the drain T1d may be a single-layer or multi-layer structure composed of a metal.

The first insulation layer IL1 is located on a side of the first transistor T1 away from the substrate 10, and may cover the normal pixel regions NP and the redundant pixel regions DP. In some examples, the first insulation layer IL1 includes a first passivation layer PVX, and a planarization layer PLN. The planarization layer PLN is disposed on a side of the first passivation layer PVX away from the substrate 10, and the first passivation layer PVX may be made of a material including, for example, silicon oxynitride, silicon oxide, silicon nitride, or the like. The planarization layer PLN is disposed on a side of the first passivation layer PVX away from the substrate 10, and the planarization layer PLN may be made of an organic insulating material including, for example, a resin-based material such as polyimide, epoxy, acryl, polyester, photoresist, polyacrylate, polyamide, siloxane, or the like.

The common electrode 15 is disposed on a side of the first insulation layer IL1 away from the substrate 10 and in a first transparent conductive layer M3, and may be made of a material including a transparent conductive material such as indium tin oxide. A first hollowed-out portion h1 is provided in the common electrode 15 at a position corresponding to the drain T1d of the first transistor T1, and an orthographic projection of the first hollowed-out portion h1 on the substrate 10 is overlapped with an orthographic projection of the drain T1d of the first transistor T1 on the substrate 10. The shape of the first hollowed-out portion h1 is not particularly limited in the embodiments of the present disclosure, and for example, an orthographic projection of the first hollowed-out portion h1 on the substrate 10 may have a rectangular shape, a circular shape, an elliptical shape, or any other shape.

A second insulation layer IL2 is disposed on a side of the common electrode 15 away from the substrate 10, and may be made of a material including, for example, silicon oxynitride, silicon oxide, silicon nitride, or the like.

In some embodiments, the first pixel electrode 11 is disposed on a side of the second insulation layer IL2 away from the substrate 10, and may be made of a material including a transparent conductive material such as indium tin oxide. The first pixel electrode 11 is connected to the drain of the first transistor T1 through a first via V1 running through the first insulation layer IL1 and the second insulation layer IL2. An orthographic projection of the first via V1 on the substrate 10 is located within an orthographic projection of the first hollowed-out portion h1 on the substrate 10, so as to prevent a short circuit between the first pixel electrode 11 and the common electrode 15.

In some examples, as shown in FIG. 12, the first pixel electrode 11 may include a first electrode body part 11a and a first electrode connection part 11b connected with each other, the first electrode body part 11a is provided with a plurality of slits SL, and the first electrode body part 11a is connected to the drain of the first transistor T1 through the first via V1. Each slit SL in the first electrode body part 11a may include a plurality of sub-slits, and two adjacent sub-slits have the same extending direction. The plurality of sub-slits in the same slit may or may not in communication.

As shown in FIGS. 5 to 12, a first transfer electrode 13 is further disposed on the side of the second insulation layer IL2 away from the substrate 10, and disposed in the same layer as the first pixel electrode 11, i.e., in a second transparent conductive layer M4. The first transfer electrode 13 is connected to the common electrode 15 through a fourth via V4 running through the second insulation layer IL2, and connected to the second transfer electrode 14 through a fifth via V5 running through the first insulation layer IL1 and the second insulation layer IL2, while the second transfer electrode 14 is connected to the first common electrode line CL1 through a sixth via V6 running through the gate insulation layer.

As shown in FIGS. 10 to 12, the common electrode 15 is further provided with a third hollowed-out portion h3, and an orthographic projection of the fifth via V5 on the substrate 10 is located within an orthographic projection of the third hollowed-out portion h3 on the substrate 10, so as to facilitate connection between the first transfer electrode 13 and the second transfer electrode 14. The shape of the third hollowed-out portion h3 is not limited in the embodiments of the present disclosure, and for example, an orthographic projection of the third hollowed-out portion h3 on the substrate 10 may have a polygonal shape, a circular shape, an elliptical shape, or any other shape.

In some embodiments, the third hollowed-out portion h3 and the first hollowed-out portion h1 in each of at least one of the normal pixel regions NP are in communication with each other, so as to form a larger hollowed-out portion and facilitate manufacturing.

In one example, as shown in FIG. 10, the first hollowed-out portion h1 may have a larger size in the second direction than the third hollowed-out portion h3.

In some embodiments, the fourth via V4 is in communication with the fifth via V5, so that the two vias can be formed simultaneously and the manufacturing process is simplified. The vias may be formed through a photolithography patterning process (including exposure, development, and etching), and when the fourth via V4 and the fifth via V5 are fabricated, a photoresist layer may be firstly formed on the second insulation layer IL2, and then exposed and developed, so that the photoresist at positions where the fourth via V4 and the fifth via V5 are to be formed is removed, and then, the second insulation layer IL2 and the first insulation layer IL1 are dry etched. Since an etching gas cannot etch the common electrode 15, the etching gas can etch away only the second insulation layer IL2 at the position where the fourth via V4 is to be formed, thereby forming the fourth via V4. In contrast, at the position where the fifth via V5 is to be formed, the etching gas can etch away both the first insulation layer IL1 and the second insulation layer IL2, forming the fifth via V5.

In addition, since the first via V1 also runs through both the first insulation layer IL1 and the second insulation layer IL2, the fourth via V4 and the fifth via V5 may be formed in synchronization with the first via V1, while the first transfer electrode 13 may be formed in synchronization with the first pixel electrode 11, and the second transfer electrode 14 may be formed in synchronization with the common electrode 15, so that the common electrode 15 can be connected to the first common electrode line CL1 without adding any process step.

In some embodiments, each pixel region P is provided with a first transfer electrode 13 and a second transfer electrode 14. In other words, the common electrode 15 is connected to the first common electrode line CL1 in each pixel region, so that the voltage can be more uniformly distributed throughout the common electrode 15.

In some embodiments, an orthographic projection of the first electrode body part 11a on the substrate 10 and an orthographic projection of the second transfer electrode 14 in the same pixel region P on the substrate 10, are sequentially arranged in the first direction.

Figure 13:
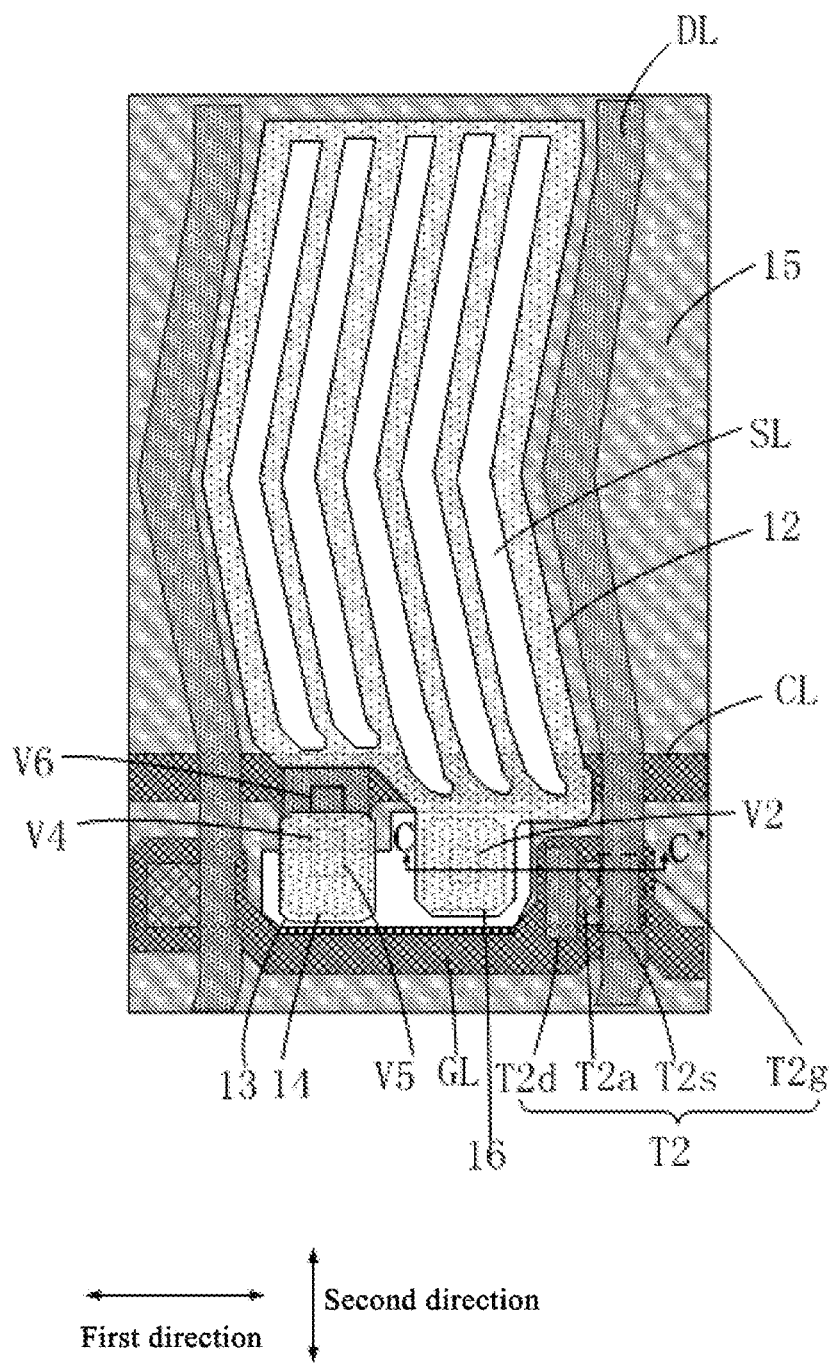
FIG. 13 is a structural plan view of a first redundant pixel region according to some embodiments of the present disclosure.
Figure 14:
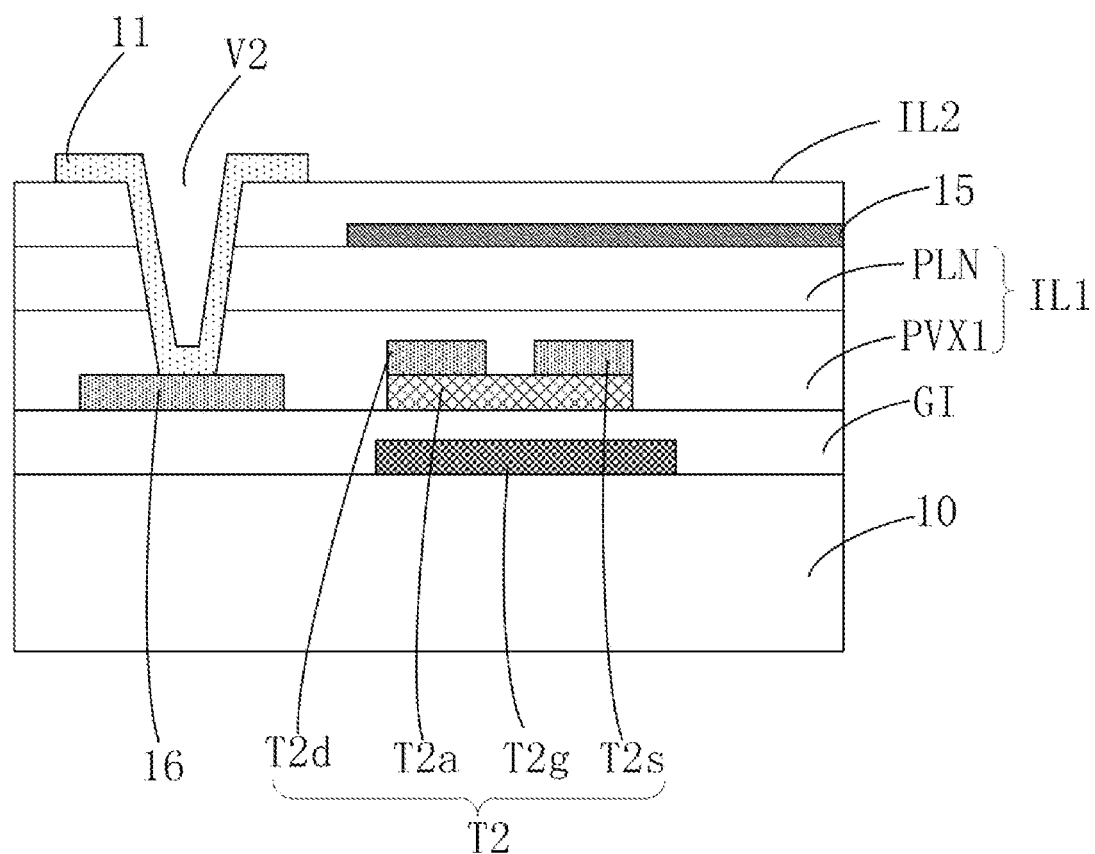
FIG. 14 is a sectional view taken along line C-C' in FIG. 13.
Figure 15:
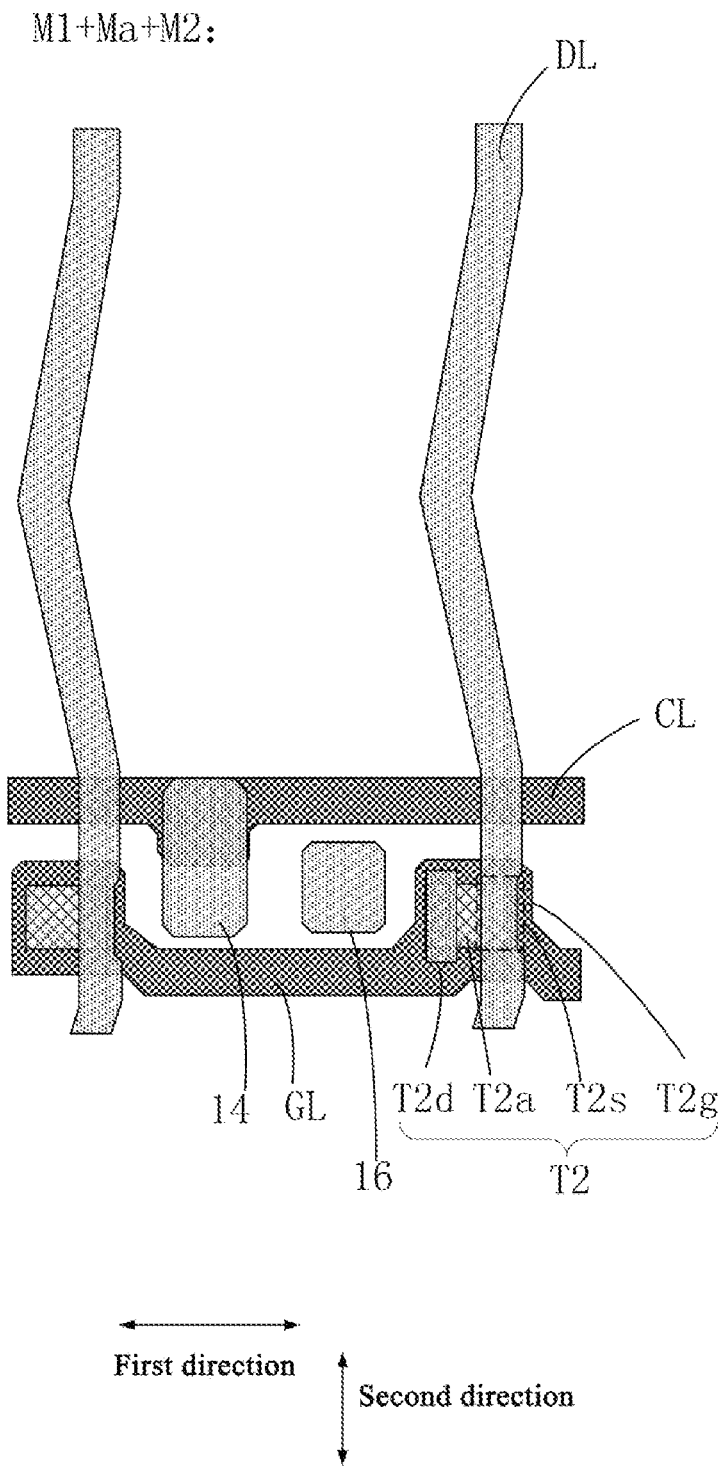
FIG. 15 is a plan view of a superposition of a gate metal layer, a semiconductor layer, and a source-drain metal layer in FIG. 13.
Figure 16:
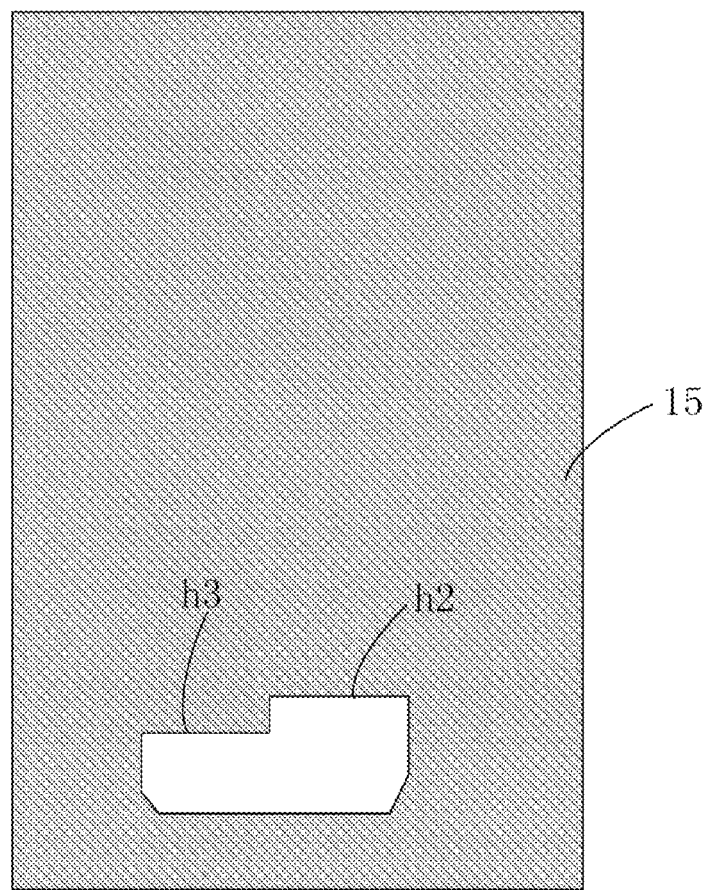
FIG. 16 is a plan view of a superposition of a first transparent conductive layer in FIG. 13.
Figure 17:
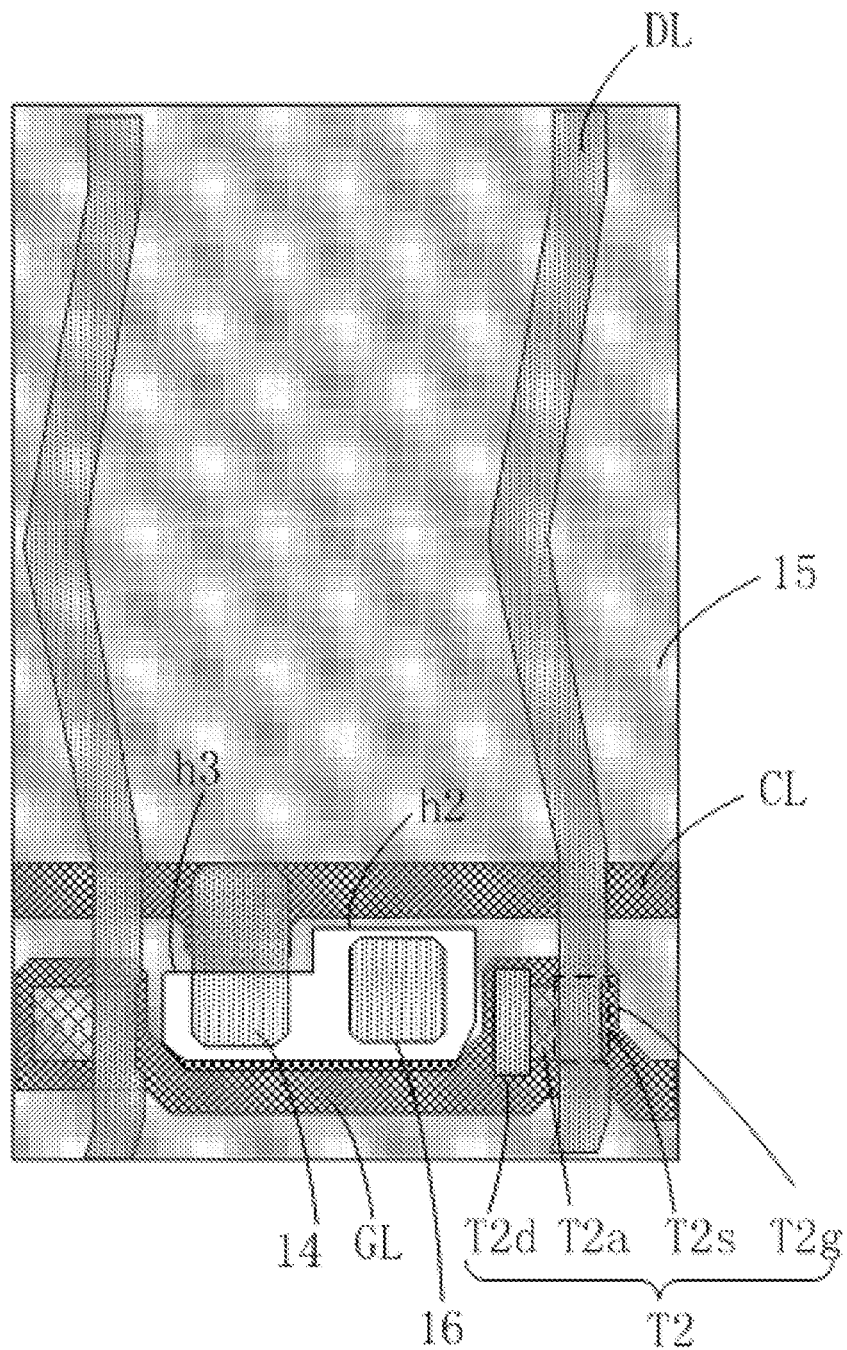
FIG. 17 is a plan view of a superposition of the structures in FIGS. 15 and 16.
Figure 18:
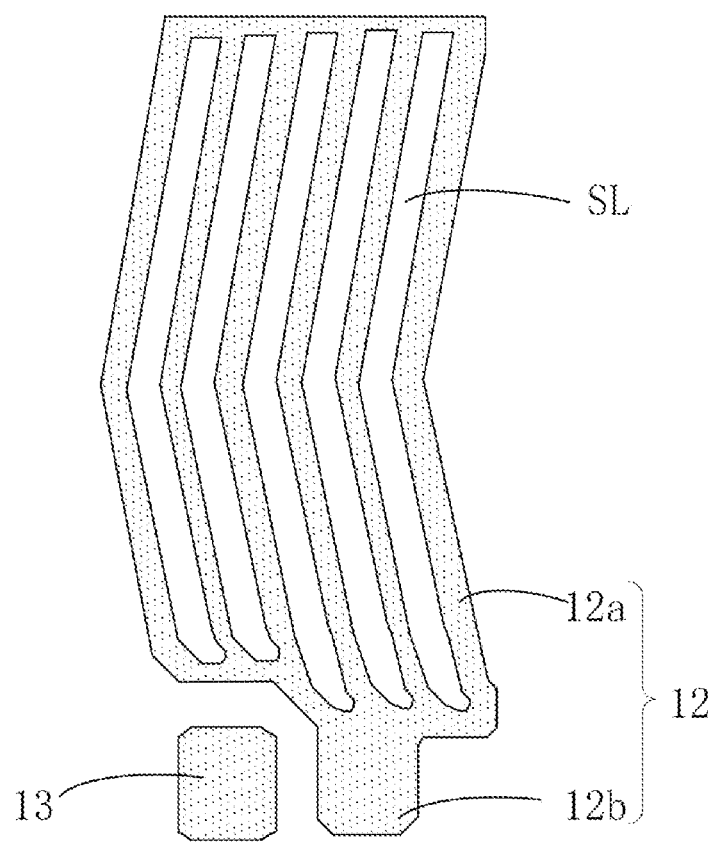
FIG. 18 is a plan view of a second transparent conductive layer in FIG. 13.

As shown in FIG. 3, the plurality of redundant pixel regions DP include a plurality of first redundant pixel regions DP1 and a plurality of second redundant pixel regions DP2. FIG. 13 is a structural plan view of a first redundant pixel region according to some embodiments of the present disclosure, FIG. 14 is a sectional view taken along line C-C' in FIG. 13, FIG. 15 is a plan view of a superposition of a gate metal layer, a semiconductor layer, and a source-drain metal layer in FIG. 13, FIG. 16 is a plan view of a superposition of a first transparent conductive layer in FIG. 13, FIG. 17 is a plan view of a superposition of the structures in FIGS. 15 and 16, and FIG. 18 is a plan view of a second transparent conductive layer in FIG. 13.

As shown in FIGS. 13 to 18, in a first redundant pixel region DP1, a gate T2g of a second transistor T2 is connected to, and disposed in the same layer as, the gate line GL, and the gate of the second transistor T2 and the gate line GL may be formed as an integral structure. A gate insulation layer GI may cover the first redundant pixel region DP1.

An active layer T2a of the second transistor T2 is located on a side of the gate insulation layer away from the substrate 10, and disposed in the same layer as the active layer T1a of the first transistor T1, i.e., in the semiconductor layer Ma. A source and a drain of the second transistor T2 are disposed on a side of the active layer T2a away from the substrate 10, and disposed in the same layer as the source T1s and the drain T1d of the first transistor T1, and the data line DL. The source T2s of the second transistor T2 is connected to a source connection part of the active layer T2a, and the drain T2d of the second transistor T2 is connected to a drain connection part of the active layer T2a. The source T2s of the second transistor T2 may be formed as an integral structure with the corresponding data line DL.

In some examples, the source T2s and the drain T2d of the second transistor T2 each have an orthographic projection on the substrate 10 overlapped with an orthographic projection of the gate T2g of the second transistor T2 on the substrate 10. For example, the source T2s and the drain T2d of the second transistor T2 each have an orthographic projection on the substrate 10 located within the orthographic projection of the gate T2g on the substrate 10.

In at least one first redundant pixel region DP1, a connection part 16 is further provided, and the connection part 16 is disposed in the same layer as, and insulated and spaced apart from, the source T2s and the drain T2d of the second transistor T2.

In addition, as shown in FIG. 17, in the first redundant pixel region DP1, the second transfer electrode 14 as described above may be further provided in the source-drain metal layer M2.

Each of the first insulation layer IL1 and the second insulation layer IL2 covers the first redundant pixel region DP1, that is, covers the second transistor T2 in the first redundant pixel region DP1. At least a portion of the common electrode 15 also covers the first redundant pixel region DP1, and a second hollowed-out portion h2 is provided in the common electrode 15 at a position corresponding to the connection part 16. The shape of the second hollowed-out portion h2 is not particularly limited in the embodiments of the present disclosure, and for example, an orthographic projection of the second hollowed-out portion h2 on the substrate 10 may have a circular shape, an elliptical shape, a polygonal shape, or any other shape.

As shown in FIGS. 13 to 15, the second pixel electrode 12 is disposed on a side of the second insulation layer IL2 away from the substrate 10, and in the same layer as the first pixel electrode 11. In the first redundant pixel region DP1, the second pixel electrode 12 is electrically connected to the connection part through a second via V2 running through the first insulation layer IL1 and the second insulation layer IL2. An orthographic projection of the second via V2 on the substrate 10 is located within an orthographic projection of the second hollowed-out portion h2 of the common electrode 15 on the substrate 10, so as to prevent the common electrode 15 from affecting the connection between the second pixel electrode 12 and the connection part.

In the first redundant pixel region DP1, the second pixel electrode 12 includes a second electrode body part 12a and a second electrode connection part 12b connected with each other, the second electrode body part 12a is provided with a plurality of slits SL, and the second electrode connection part 12b is connected to the connection part 16. The second electrode body part 12a may have the same shape as the first electrode body part 11a, and the second electrode connection part 12b may have the same shape as the first electrode connection part 11b, so that the first pixel electrode 11 and the second pixel electrode 12 can be manufactured at the same time.

In some embodiments, as shown in FIGS. 13 and 18, in the first redundant pixel region DP1, the first transfer electrode 13 as described above may be further provided and disposed in the same layer as the first pixel electrode 11. In the first redundant pixel region DP1, the common electrode 15, the first transfer electrode 13, the second transfer electrode 14, and the first common electrode line CL are connected in the same manner as in FIG. 4, that is, the first transfer electrode 13 is connected to the common electrode 15 through the fourth via V4 running through the second insulation layer IL2, and connected to the second transfer electrode 14 through the fifth via V5 running through the first insulation layer IL1 and the second insulation layer IL2, while the second transfer electrode 14 is connected to the first common electrode line CL1 through the sixth via V6 running through the gate insulation layer GI.

In the first redundant pixel region DP1, the orthographic projection of the fifth via V5 on the substrate 10 is also located within an orthographic projection of the third hollowed-out portion h3 on the substrate 10, so as to facilitate connection between the first transfer electrode 13 and the second transfer electrode 14.

In some embodiments, in at least one first redundant pixel region DP1, the third hollowed-out portion h3 and the second hollowed-out portion h2 in the common electrode 15 are in communication with each other to facilitate manufacturing. For example, the third hollowed-out portion h3 is in communication with the second hollowed-out portion h2 in each first redundant pixel region DP1.

The second hollowed-out portion h2 may have a larger size in the second direction than the third hollowed-out portion h3. For example, the second hollowed-out portion h2 may have the same shape and size as the first hollowed-out portion h1.

Figure 19:
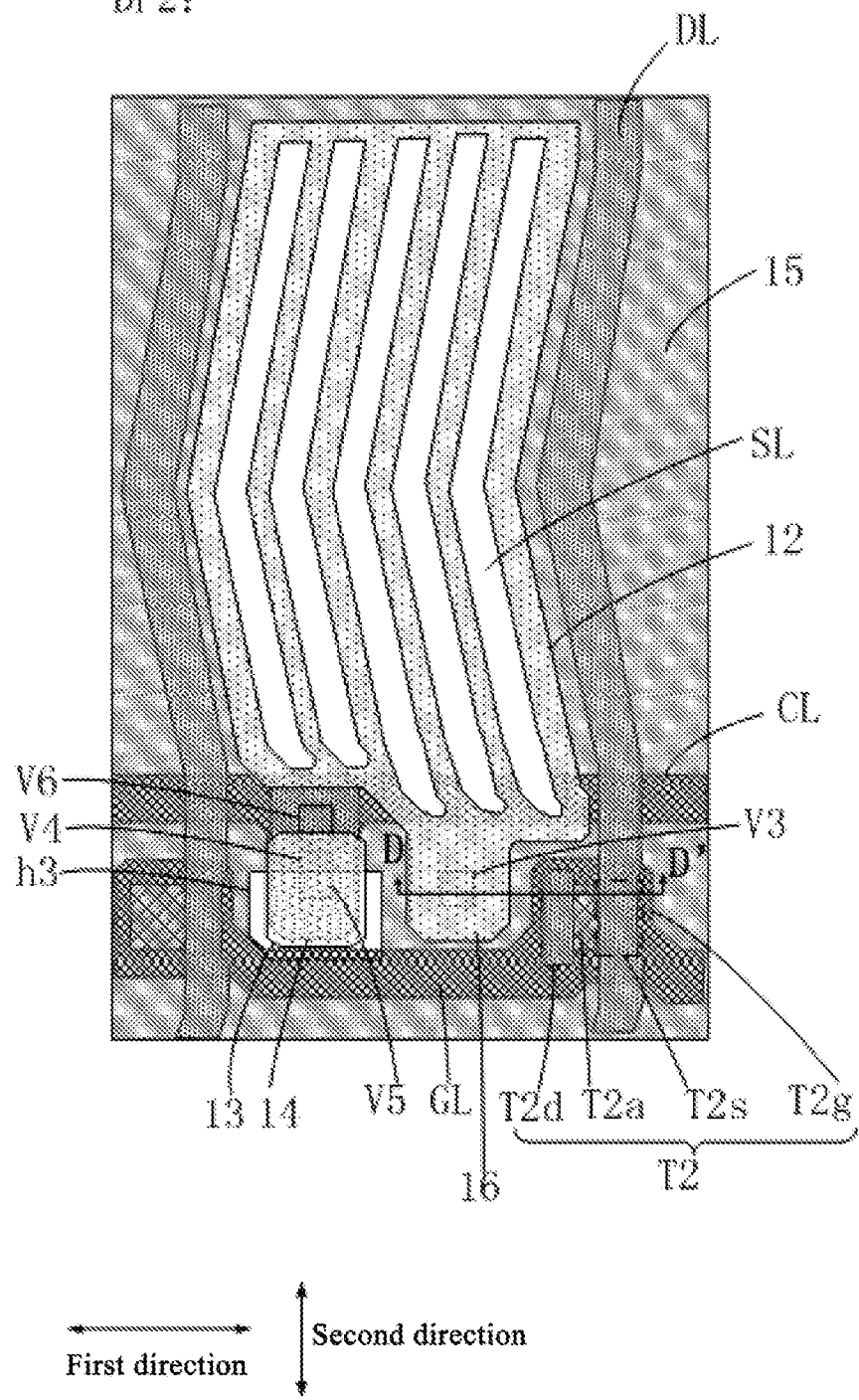
FIG. 19 is a structural plan view of a second redundant pixel region according to some embodiments of the present disclosure.
Figure 20:
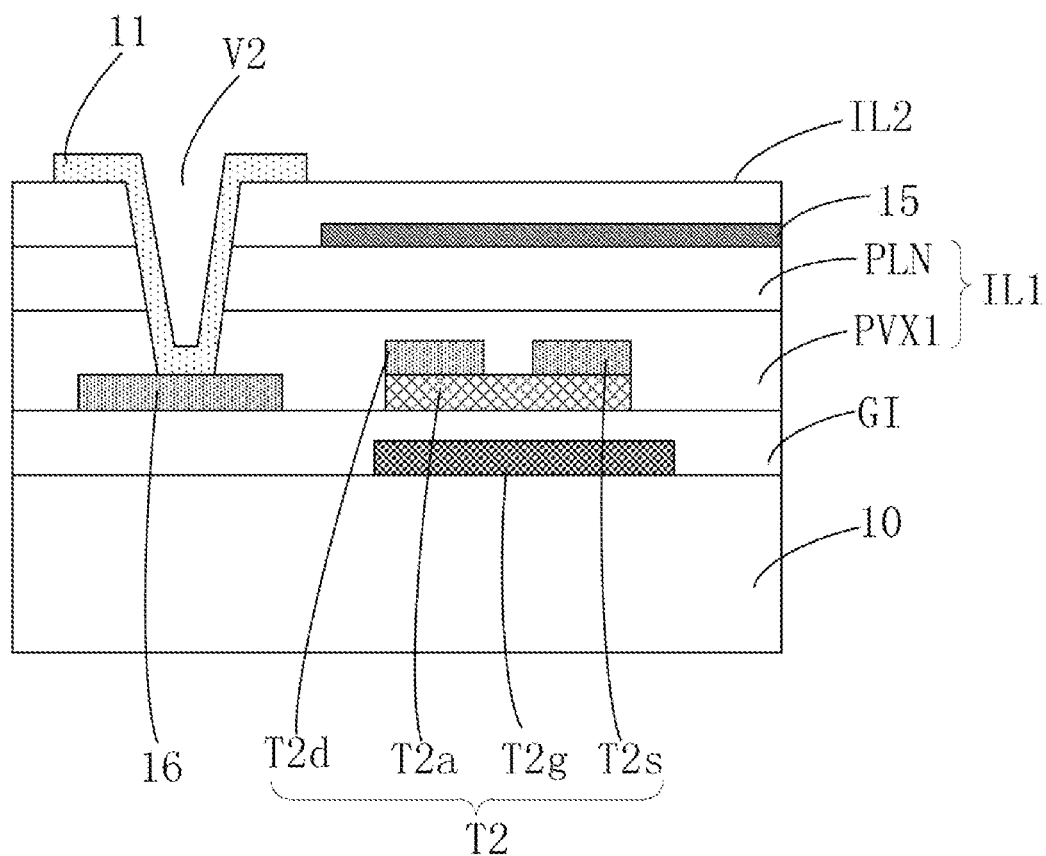
FIG. 20 is a sectional view taken along line D-D' in FIG. 19.
Figure 21:
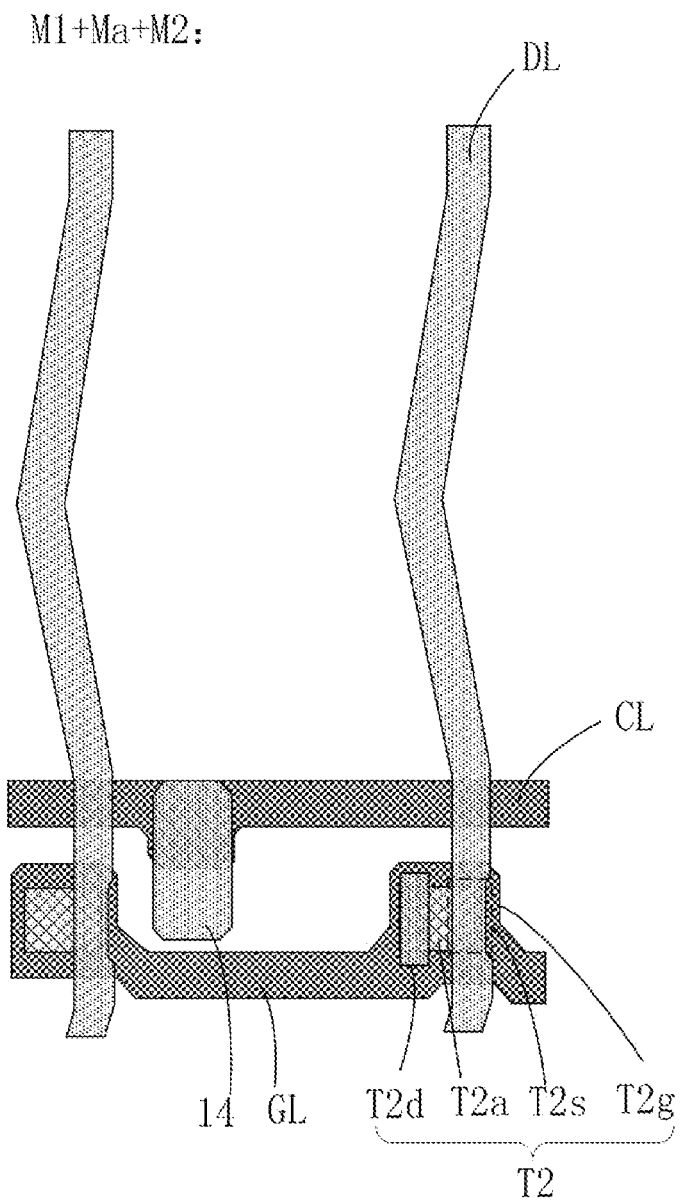
FIG. 21 is a plan view of a superposition of a gate metal layer, an active layer, and a source-drain metal layer in FIG. 19.
Figure 22:
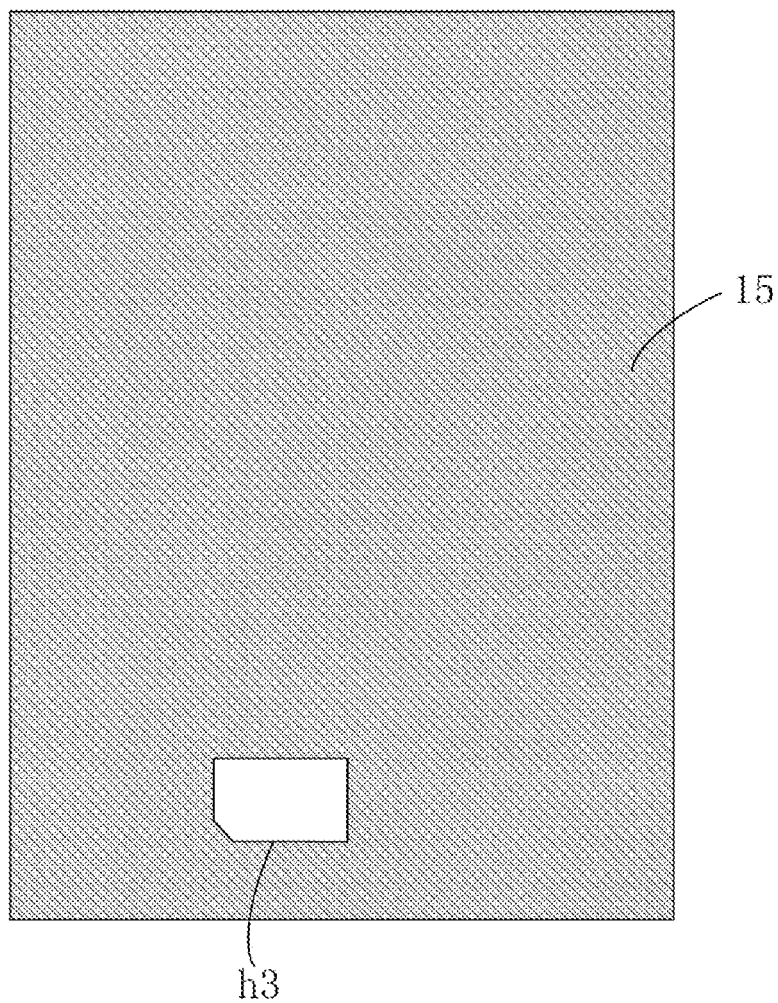
FIG. 22 is a plan view of a first transparent conductive layer in FIG. 19.
Figure 23:
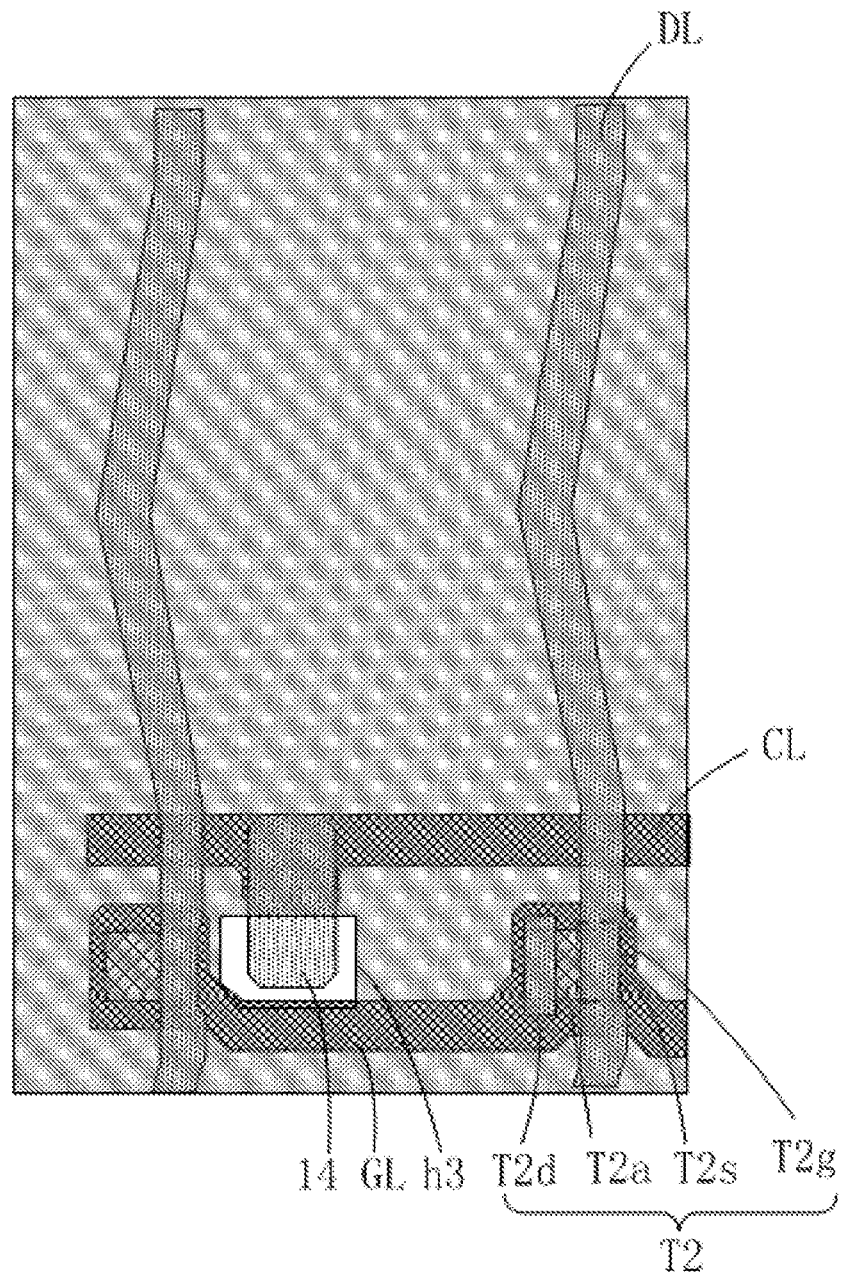
FIG. 23 is a plan view of a superposition of the structures in FIGS. 19 and 21.
Figure 24:
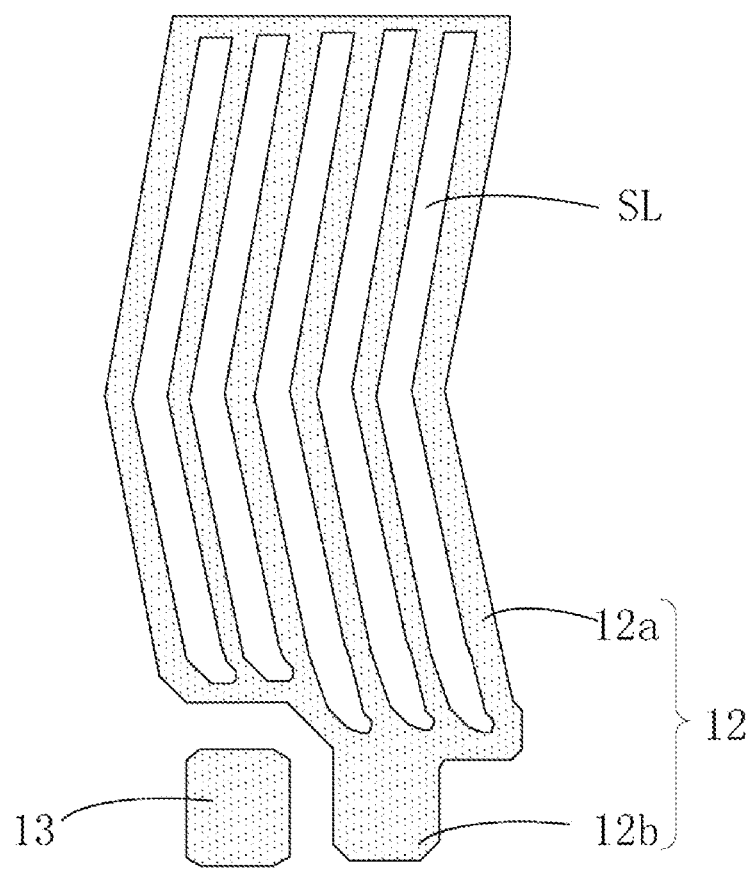
FIG. 24 is a plan view of a second transparent conductive layer in FIG. 19.

FIG. 19 is a structural plan view of a second redundant pixel region according to some embodiments of the present disclosure, FIG. 20 is a sectional view taken along line D-D' in FIG. 19, FIG. 21 is a plan view of a superposition of a gate metal layer, an active layer, and a source-drain metal layer in FIG. 19, FIG. 22 is a plan view of a first transparent conductive layer in FIG. 19, FIG. 23 is a plan view of a superposition of the structures in FIGS. 19 and 21, and FIG. 24 is a plan view of a second transparent conductive layer in FIG. 19.

As shown in FIGS. 19 to 24, in a second redundant pixel region DP2, a gate of a second transistor T2 is connected to, and disposed in the same layer as, the gate line GL, and the gate of the second transistor T2 and the gate line GL may be formed as an integral structure. A gate insulation layer GI may cover the second redundant pixel region DP2.

The second transistor T2 in the second redundant pixel region DP2 has the same structure and arrangement manner as the second transistor T2 in the first redundant pixel region DP1, and details are not repeated here.

In addition, as shown in FIG. 23, in the second redundant pixel region DP2, the second transfer electrode 14 as described above may be further provided in the source-drain metal layer. In the second redundant pixel region DP2, the second pixel electrode 12 is not connected to a drain T2d of the second transistor T2, and an orthographic projection of the drain T2d of the second transistor T2 on the substrate 10 may be overlapped, or not overlapped, with an orthographic projection of the second pixel electrode 12 on the substrate 10.

Each of the first insulation layer IL1 and the second insulation layer IL2 covers the second redundant pixel region DP2, that is, covers the second transistor T2 in the second redundant pixel region DP2. At least a portion of the common electrode 15 also covers the second redundant pixel region DP2, and a third hollowed-out portion h3 is provided in the common electrode 15 at a position corresponding to the second transfer electrode 14.

As shown in FIGS. 19 to 23, in a second redundant pixel region DP2, the first transfer electrode 13 as described above may be further provided and disposed in the same layer as the first pixel electrode 11 and the second pixel electrode 12. In the second redundant pixel region DP2, the first transfer electrode 13 is connected to the common electrode 15 through a fourth via V4 running through the second insulation layer IL2, and connected to the second transfer electrode 14 through a fifth via V5 running through the first insulation layer IL1 and the second insulation layer IL2, while the second transfer electrode 14 is connected to the first common electrode line CL1 through the sixth via V6 running through the gate insulation layer GI. In the second redundant pixel region DP2, the orthographic projection of the fifth via V5 on the substrate 10 is also located within an orthographic projection of the third hollowed-out portion h3 on the substrate 10, so as to facilitate connection between the first transfer electrode 13 and the second transfer electrode 14.

In addition, in the second redundant pixel region DP2, the second pixel electrode 12 is connected to the common electrode 15, which, compared with a second pixel electrode 12 in a floating state, enables the second pixel electrode 12 and the common electrode 15 to keep the same voltage, so that the electric field in the second redundant pixel region DP2 is more stable without interference with other signals, thereby avoiding affecting the liquid crystal in an adjacent normal pixel region NP. The second pixel electrode 12 is connected to the common electrode 15 through a third via V3 running through the second insulation layer IL2.

Similar to the first pixel electrode 11, the second pixel electrode 12 in the second redundant pixel region DP2 includes a second electrode body part 12a and a second electrode connection part 12b, the second electrode body part 12a is provided with slits SL, and the second electrode body part 12a is connected to the common electrode 15 through the third via V3.

As shown in FIG. 3, the second region S2 includes a bonding region S2a on a side of the first region S1 in the second direction, and the redundant pixel regions DP are provided on a side of the first region S1 away from the bonding region S2a, and two opposite sides of the first region S1 in the first direction. The bonding region S2a may be provided with a bonding electrode PAD configured to be connected to a drive circuit board, so as to receive a driving signal from the drive circuit board. For example, the bonding region S2a is located at a lower side of the first region S1, and the first direction is a left-right direction in FIG. 3. Then, the redundant pixel regions DP are provided at an upper side, and both left and right sides, of the bonding region S2a.

Since the image is not displayed at the position corresponding to the redundant pixel region DP, too many redundant pixel regions DP may lead to a wider bezel of the display. Therefore, in some embodiments, one row of redundant pixel regions DP is disposed on a side of the first region S1 away from the bonding region, and one column of redundant pixel regions DP is disposed on each side of the first region S1 in the first direction, so that the display effect can be improved while avoiding a too large bezel width of the display. Apparently, in other embodiments, two, three or more rows of redundant pixel regions DP may be disposed on the side of the first region S1 away from the bonding region, and two, three or more columns of redundant pixel regions DP may be disposed on each side of the first region S1 in the first direction.

In one example, on each side of the first region S1 in the first direction, each disposed redundant pixel region DP may be specifically referred to as a first redundant pixel region DP1; and each redundant pixel region DP on the side of the first region S1 away from the bonding region S2a may be specifically referred to as a second redundant pixel region DP2.

In some embodiments, the display substrate further includes a second common electrode line CL2 in the second region S2, and the second common electrode line CL2 may be connected to a bonding electrode PAD in the bonding region, to receive a common voltage signal from the drive circuit board. The first common electrode line CL1 is connected to the second common electrode line CL2.

Figure 25:
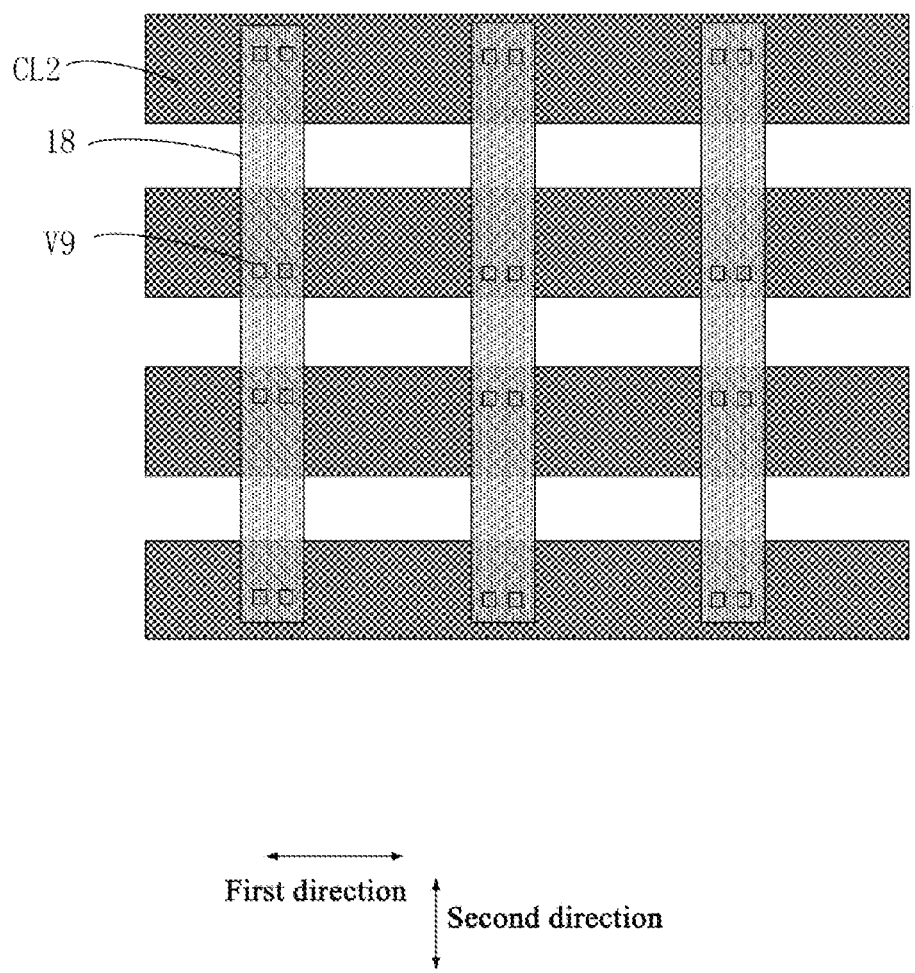
FIG. 25 is a plan view of a second common electrode line and a fourth transfer electrode in a region on a side of a first region away from a bonding region.
Figure 26:
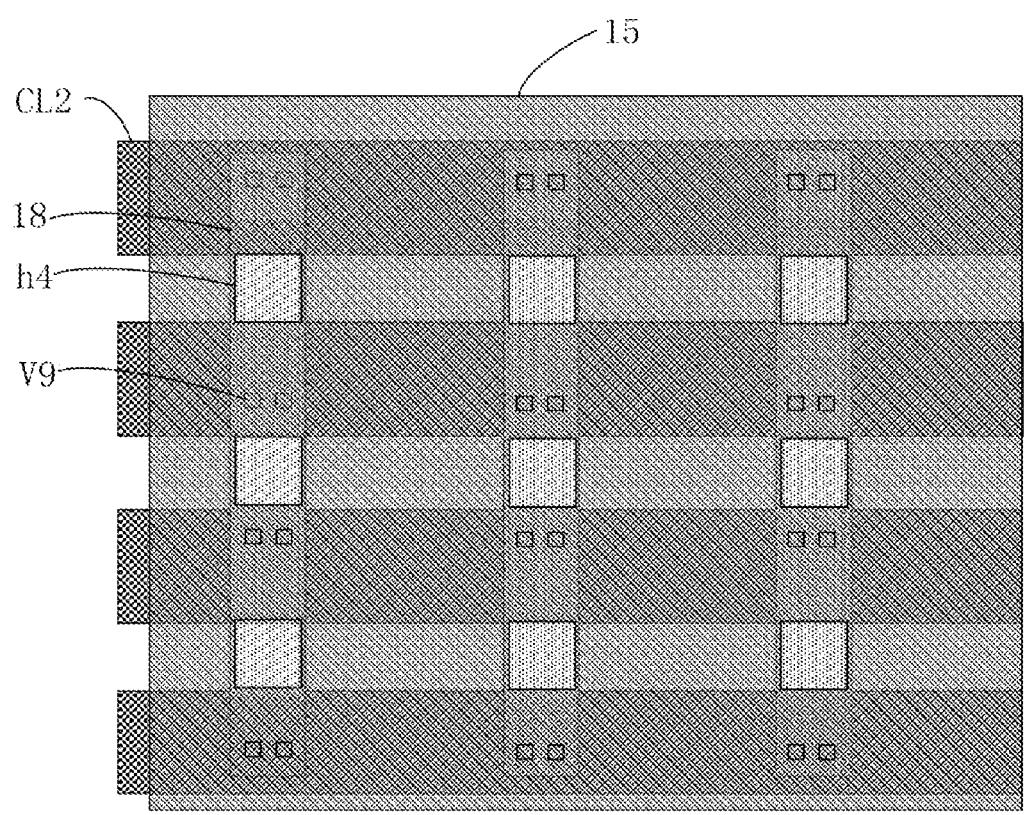
FIG. 26 is a plan view of a superposition of the structure in FIG. 25 and a common electrode.
Figure 27:
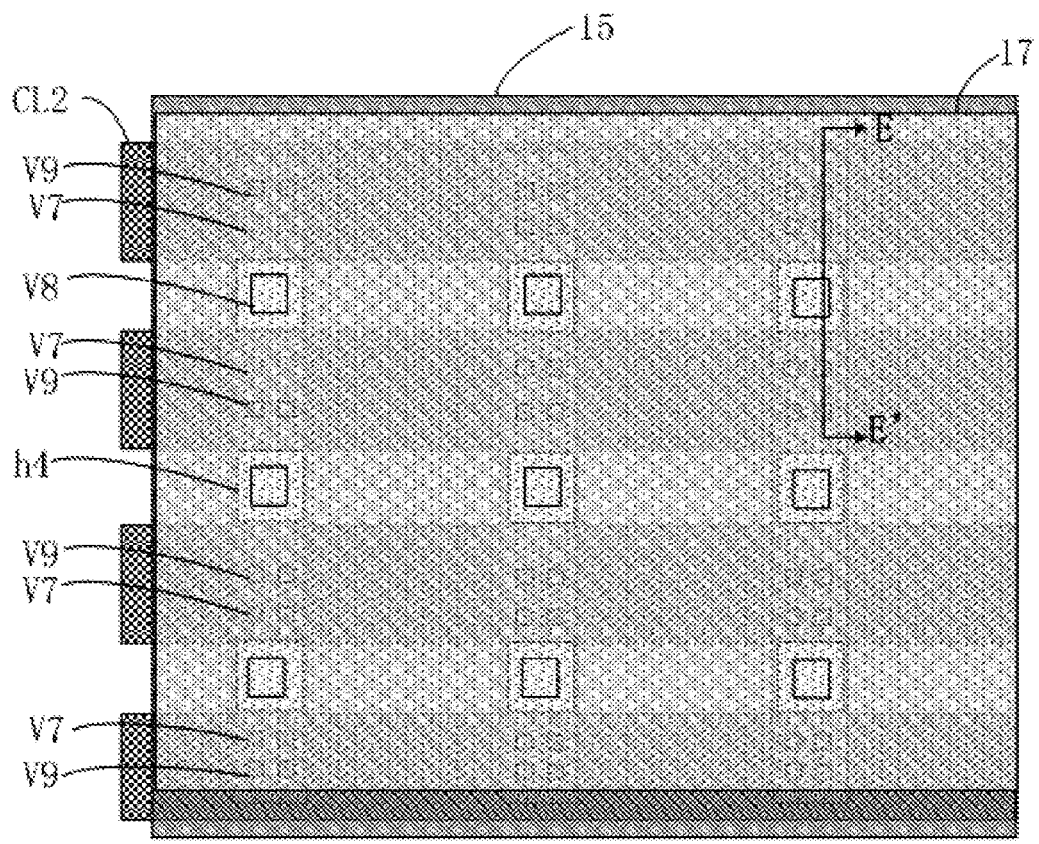
FIG. 27 is a plan view of a superposition of the structure in FIG. 26 and a first transfer electrode.
Figure 28:
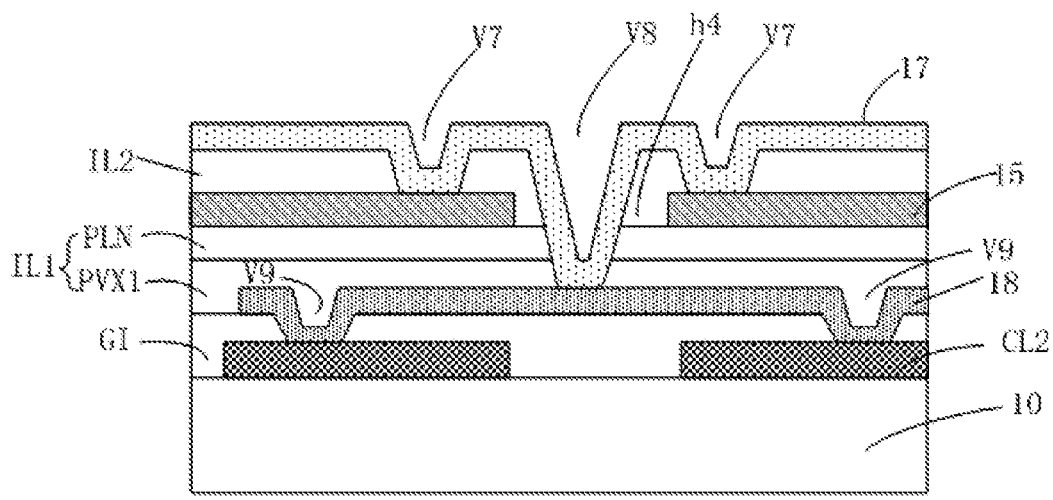
FIG. 28 is a sectional view taken along line E-E' in FIG. 27.
Figure 29:
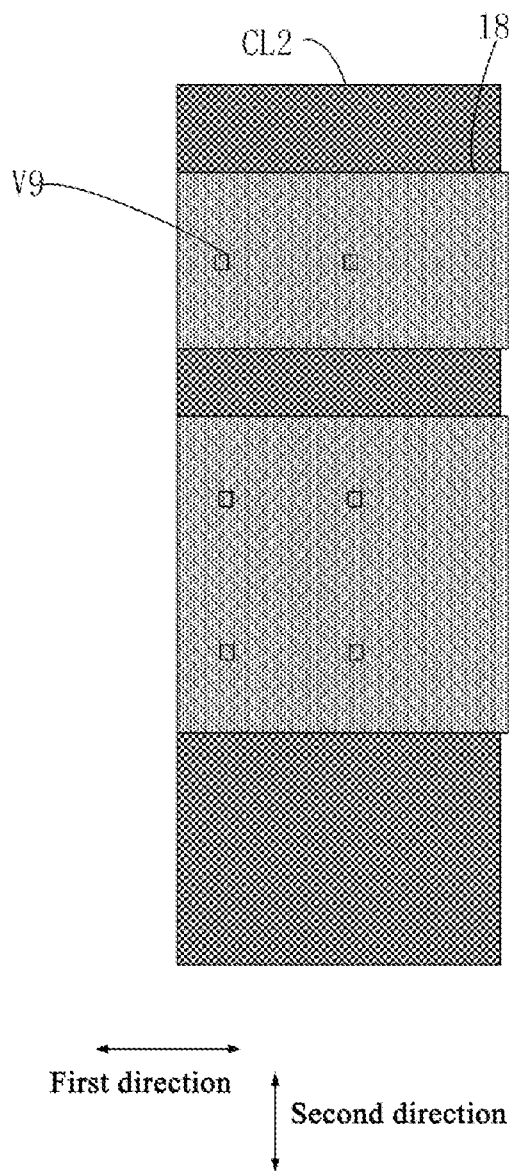
FIG. 29 is a plan view of a first common electrode line and a fourth transfer electrode in a region on the left/right side of a first region.
Figure 30:
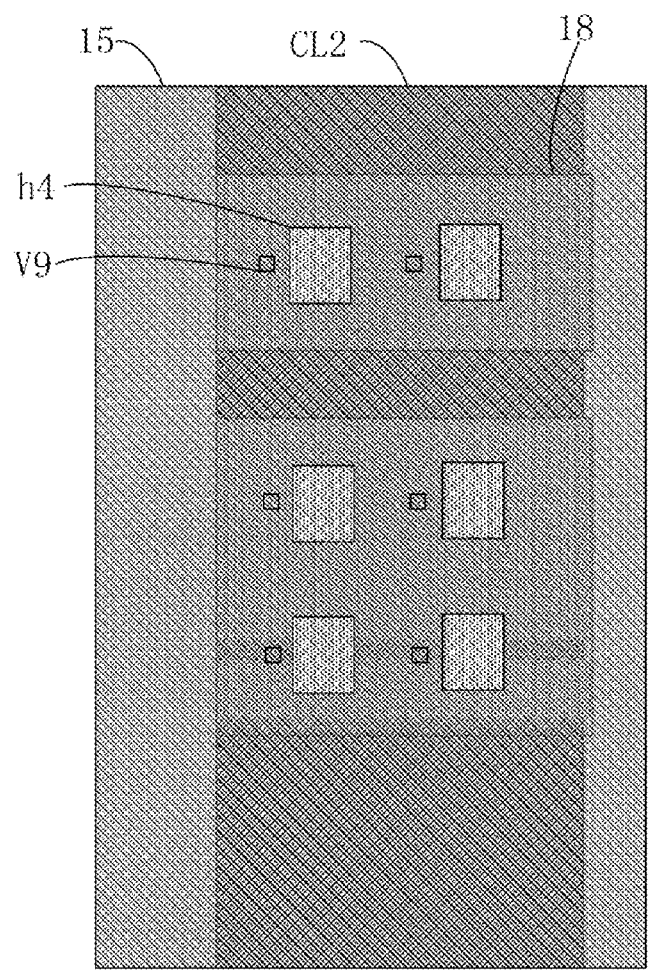
FIG. 30 is a plan view of a superposition of the structure in FIG. 29 and a common electrode.
Figure 31:
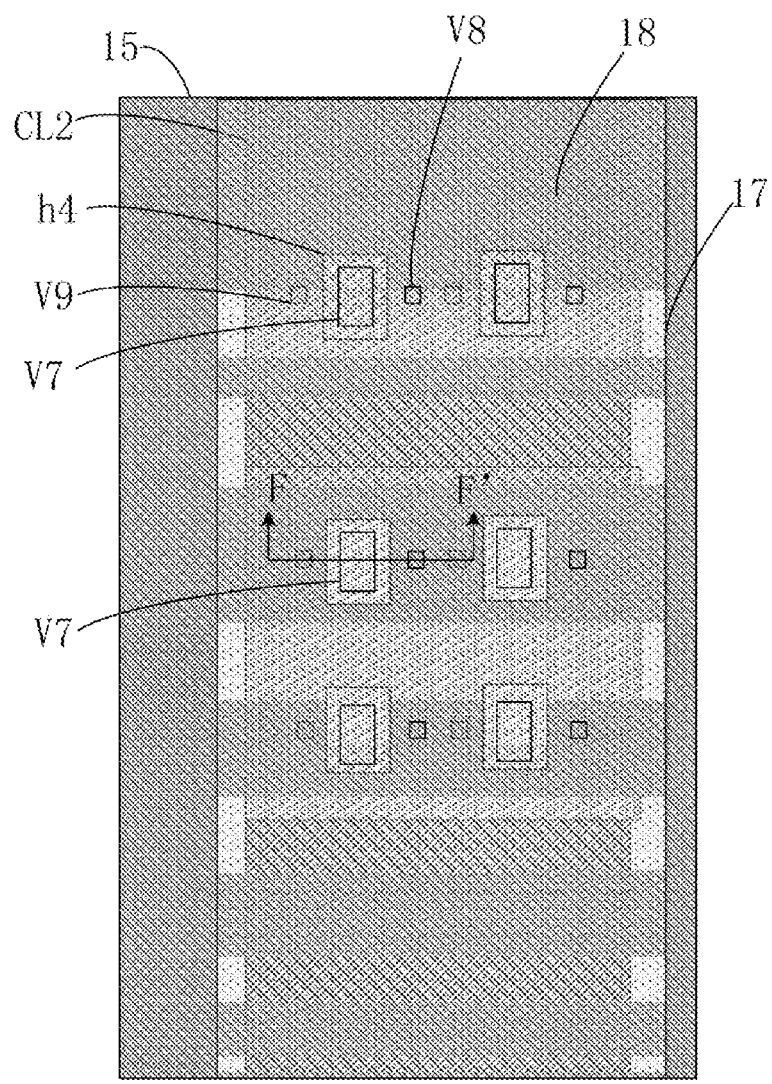
FIG. 31 is a plan view of a superposition of the structure in FIG. 30 and a first transfer electrode.
Figure 32:
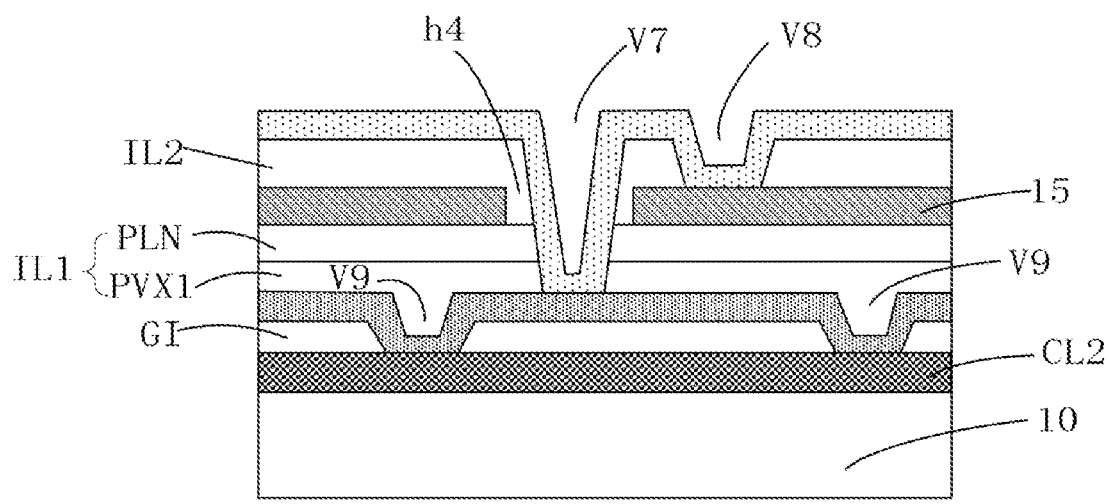
FIG. 32 is a sectional view taken along line F-F' in FIG. 31.

FIG. 25 is a plan view of a second common electrode line and a fourth transfer electrode in a region on a side of a first region away from a bonding region, FIG. 26 is a plan view of a superposition of the structure in FIG. 25 and a common electrode, FIG. 27 is a plan view of a superposition of the structure in FIG. 26 and a first transfer electrode, FIG. 28 is a sectional view taken along line E-E' in FIG. 27, FIG. 29 is a plan view of a first common electrode line and a fourth transfer electrode in a region on the left/right side of a first region, FIG. 30 is a plan view of a superposition of the structure in FIG. 29 and a common electrode, FIG. 31 is a plan view of a superposition of the structure in FIG. 30 and a first transfer electrode, and FIG. 32 is a sectional view taken along line F-F' in FIG. 31.

As shown in FIGS. 25 to 32, the second common electrode line CL2 is located between the gate insulation layer GI and the substrate 10, and disposed in the same layer as the gate line GL. The first insulation layer IL1, the second insulation layer IL2, and the common electrode 15 all extend to the second region S2, and a fourth hollowed-out portion h4 is provided in the common electrode 15.

The second region S2 is further provided with a third transfer electrode 17 and a fourth transfer electrode 18. The third transfer electrode 17 is disposed in the same layer as the first pixel electrode 11; and the fourth transfer electrode 18 is disposed in the same layer as the source and the drain of the first transistor T1. The third transfer electrode 17 is connected to the common electrode 15 through a seventh via V7 running through the second insulation layer IL2, and connected to the fourth transfer electrode 18 through an eighth via V8 running through the first insulation layer IL1 and the second insulation layer IL2, while the fourth transfer electrode 18 is connected to the second common electrode line CL2 through a ninth via V9 running through the gate insulation layer GI. Orthographic projections of the seventh via V7, the eighth via V8 and the ninth via V9 on the substrate 10 are not limited in the embodiments of the present disclosure, and for example, may each have a circular shape, a polygonal shape, or any other shape. In addition, the arrangement manner of the seventh via V7, the eighth via V8 and the ninth via V9 is not limited in the embodiments of the present disclosure.

An orthographic projection of the eighth via V8 on the substrate 10 is located within an orthographic projection of the fourth hollowed-out portion h4 on the substrate 10.

In some embodiments, a plurality of fourth transfer electrodes 18 may be provided on both left and right sides of the first region S1 and on a side of the first region S1 away from the bonding region. In addition, one or more third transfer electrodes 17 may be provided on each of the left and right sides of the first region S1, and the side of the first region S1 away from the bonding region.

In some embodiments, as shown in FIGS. 26 to 31, on the side of the first region S1 away from the bonding region S2a, a plurality of fourth transfer electrodes 18, each extending in the second direction, may be provided, in which one or more second common electrode lines CL2 are arranged in the first direction. On the left and right sides of the first region S1, one or more second common electrode lines CL2 may be provided. In addition, generally, signal transmission lines may be provided on both left and right sides of the first region S1. The signal transmission lines are configured to connect the gate drive circuit and the gate line GL, and disposed in the same layer as the fourth transfer electrode 18. To prevent a short circuit between the signal transmission lines and the fourth transfer electrode 18, in some embodiments, a plurality of fourth transfer electrodes 18 may be disposed on the left and right sides of the first region S1, and the signal transmission lines pass through a space between the fourth transfer electrodes 18.

In the existing art, where the vias for connecting the common electrode 15 and the second common electrode line CL2 in the second region S2 are arranged densely, an alignment liquid tends to be accumulated near the vias during formation of the alignment layer, making the finally formed alignment layer not uniform near the vias and thus affecting deflection of the liquid crystal, and causing a black line or a dark shadow at an upper edge of the display image (i.e., the edge away from the bonding region S2a). In contrast, in the embodiments of the present disclosure, the redundant pixel regions DP are disposed around the plurality of normal pixel regions NP, so that increased distances are provided between vias in the normal pixel regions NP and in the second region S2, and liquid crystal deflection in the normal pixel regions NP caused by the non-uniform alignment layer near the vias is prevented.

In some embodiments of the present disclosure, a distance from the orthographic projection of each via in the second region S2 (i.e., the seventh via V7, the eighth via V8, and the ninth via V9) on the substrate 10 to a region where the plurality of normal pixel regions are located is greater than 100 μm. For example, the distance from the orthographic projection of each via in the second region S2 on the substrate 10 to the region where the plurality of normal pixel regions are located is greater than 120 μm, or greater than 140 μm, or greater than 150 μm.

An embodiment of the present disclosure further provides a display apparatus, including the display substrate according to any of the above embodiments. In addition, the display apparatus further includes an opposite substrate opposite to the display substrate, and a liquid crystal layer between the display substrate and a color filter substrate. The opposite substrate includes a substrate 10, and a color filter layer on the substrate 10. The color filter layer may include a red color filter block corresponding to the red pixel region, a green color filter block corresponding to the green pixel region, and a blue color filter block corresponding to the blue pixel region.

In some examples, the display apparatus may be a smartphone, a tablet, a television, a monitor, a laptop, a digital album, a navigator or any other product or component having a display function.

It should be noted that in the drawings, sizes of the layers and regions may be exaggerated for clarity of illustration. Moreover, it will be understood that when an element or layer is referred to as being "on" another element or layer, it may be directly on the another element or layer, or intervening layers may be present. In addition, it will be understood that when an element or layer is referred to as being "under" another element or layer, it may be directly under the other element or more than one intervening layer or element may be present. In addition, it will be further understood that when a layer or element is referred to as being "between" two layers or elements, it may be the only layer between the two layers or elements, or more than one intervening layer or element may be present. Like reference numerals refer to like elements throughout the disclosure.

Other implementations of the present disclosure will be apparent to those of ordinary skill in the art from consideration of the description and practice of the present disclosure disclosed herein. The present disclosure is intended to cover any variations, uses, or adaptations of the present disclosure which follow general principles of the present disclosure and include common knowledge or conventional technical means in the art that are not disclosed herein. The description and the embodiments are intended to be considered as exemplary only, with a true scope and spirit of the present disclosure being indicated by the following claims.

It will be appreciated that the present disclosure is not limited to the precise structures as described above and shown in the drawings, and that various modifications and changes may be made without departing from the scope of the present disclosure. The scope of the present disclosure is defined only by the appended claims.

What is claimed is:

1. A display substrate, comprising:
   a substrate comprising a first region and a second region at a periphery of the first region; and
   a plurality of gate lines and a plurality of data lines on the substrate, wherein the plurality of gate lines and the plurality of data lines are intersected with each other to define a plurality of pixel regions in the first region; wherein the plurality of pixel regions comprise a plurality of normal pixel regions and a plurality of redundant pixel regions at a periphery of the normal pixel regions;
   wherein each normal pixel region is provided with a first pixel electrode and a first transistor, each redundant pixel region is provided with a second pixel electrode and a second transistor, a gate of the first transistor is connected to a corresponding gate line, a source of the first transistor is connected to a corresponding data line, and a drain of the first transistor is connected to the first pixel electrode; and
   the second pixel electrode and the second transistor are insulated and spaced apart from each other, wherein the display substrate further comprises:
a first insulation layer on a side of the first transistor away from the substrate; and
a second insulation layer on a side of the first insulation layer away from the substrate;
wherein the first pixel electrode is connected to the drain of the first transistor through a first via running through the first insulation layer and the second insulation layer,
wherein the plurality of redundant pixel regions comprise a first redundant pixel region in which a connection part is disposed, and the connection part is in the same layer as, and insulated and spaced apart from, a source and a drain of the second transistor; and
in the first redundant pixel region, the second pixel electrode is on a side of the second insulation layer away from the substrate, and electrically connected to the connection part through a second via running through the first insulation layer and the second insulation layer.

2. The display substrate according to claim 1, wherein the display substrate further comprises:
a common electrode between the first insulation layer and the second insulation layer, wherein a first hollowed-out portion is provided in the common electrode at a position corresponding to the drain of the first transistor; and an orthographic projection of the first via on the substrate is within an orthographic projection of the first hollowed-out portion on the substrate.

3. The display substrate according to claim 1, wherein the first pixel electrode and the second pixel electrode are in the same layer.

4. The display substrate according to claim 1, wherein the display substrate further comprises:
a common electrode between the first insulation layer and the second insulation layer, wherein a second hollowed-out portion is provided in the common electrode at a position corresponding to the connection part; and an orthographic projection of the second via on the substrate is within an orthographic projection of the second hollowed-out portion on the substrate.

5. The display substrate according to claim 1, wherein the plurality of redundant pixel regions comprise at least one second redundant pixel region in which the second pixel electrode is electrically connected to a common electrode.

6. The display substrate according to claim 5, wherein the common electrode is between the first insulation layer and the second insulation layer, and in the second redundant pixel region, the second pixel electrode is on a side of the second insulation layer away from the substrate, and connected to the common electrode through a third via in the second insulation layer.

7. The display substrate according to claim 1, wherein the source and the drain of the first transistor are on a side of the gate of the first transistor away from the substrate, with a gate insulation layer between the source and the drain, and the gate of the first transistor; and
the display substrate further comprises:
a common electrode between the first insulation layer and the second insulation layer, and provided with a third hollowed-out portion;
a first common electrode line in the same layer as the gate of the first transistor;
a first transfer electrode in the same layer as the first pixel electrode; and
a second transfer electrode in the same layer as the source and the drain of the first transistor; wherein
the first transfer electrode is connected to the common electrode through a fourth via running through the second insulation layer, and connected to the second transfer electrode through a fifth via running through the first insulation layer and the second insulation layer, and the second transfer electrode is connected to the first common electrode line through a sixth via running through the gate insulation layer;
wherein an orthographic projection of the fifth via on the substrate is within an orthographic projection of the third hollowed-out portion on the substrate.

8. The display substrate according to claim 7, wherein the fourth via is in communication with the fifth via.

9. The display substrate according to claim 7, wherein each pixel region is provided with the first transfer electrode and the second transfer electrode.

10. The display substrate according to claim 7, wherein a first hollowed-out portion is provided in the common electrode at a position corresponding to the drain of the first transistor; and the third hollowed-out portion and the first hollowed-out portion in each of at least one of the normal pixel regions are in communication with each other.

11. The display substrate according to claim 7, wherein the plurality of redundant pixel regions comprise a first redundant pixel region in which a connection part is disposed, and a second hollowed-out portion is provided in the common electrode at a position corresponding to the connection part; and the third hollowed-out portion and the second hollowed-out portion in each of at least one first redundant pixel region are in communication with each other.

12. The display substrate according to claim 1, wherein the gate lines each extend in a first direction, the data lines each extend in a second direction, and the first direction is intersected with the second direction; and
the second region comprises a bonding region on a side of the first region in the second direction, and the redundant pixel regions are provided on a side of the first region away from the bonding region, and two opposite sides of the first region in the first direction.

13. The display substrate according to claim 1, wherein the display substrate further comprises:
a second common electrode line in the second region and in the same layer as the gate of the first transistor;
a common electrode between the first insulation layer and the second insulation layer, and provided with a fourth hollowed-out portion;
a third transfer electrode in the same layer as the first pixel electrode; and
a fourth transfer electrode in the same layer as the source and the drain of the first transistor; wherein
the third transfer electrode is connected to the common electrode through a seventh via running through the second insulation layer, and connected to the fourth transfer electrode through an eighth via running through the first insulation layer and the second insulation layer, and the fourth transfer electrode is connected to the second common electrode line through a ninth via running through a gate insulation layer;
wherein an orthographic projection of the eighth via on the substrate is within an orthographic projection of the fourth hollowed-out portion on the substrate.

14. The display substrate according to claim 13, wherein a distance from each one of the seventh via, the eighth via, and the ninth via to a region where the plurality of normal pixel regions are located is greater than 100 μm.

15. The display substrate according to claim 1, wherein the first pixel electrode comprises an electrode body part and an electrode connection part connected with each other, the electrode body part is provided with a plurality of slits, and the electrode connection part is connected to the drain of the first transistor.

16. The display substrate according to claim 1, wherein a source and a drain of the second transistor each have an orthographic projection on the substrate overlapped with an orthographic projection of a gate of the second transistor on the substrate.

17. A display apparatus, comprising the display substrate according to claim 1.

\* \* \* \* \*